United States Patent
Todoriki et al.

(10) Patent No.: US 12,463,217 B2
(45) Date of Patent: *Nov. 4, 2025

(54) GRAPHENE AND POWER STORAGE DEVICE, AND MANUFACTURING METHOD THEREOF

(71) Applicant: SEMICONDUCTOR ENERGY LABORATORY CO., LTD., Atsugi (JP)

(72) Inventors: Hiroatsu Todoriki, Kanagawa (JP); Yumiko Saito, Kanagawa (JP); Takahiro Kawakami, Kanagawa (JP); Kuniharu Nomoto, Saitama (JP); Mikio Yukawa, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,132

(22) Filed: Apr. 15, 2024

(65) Prior Publication Data

US 2024/0266538 A1  Aug. 8, 2024

Related U.S. Application Data

(63) Continuation of application No. 18/205,264, filed on Jun. 2, 2023, now Pat. No. 11,990,621, which is a
(Continued)

(30) Foreign Application Priority Data

Sep. 30, 2011  (JP) .................................. 2011-217897

(51) Int. Cl.
*H01M 4/583*  (2010.01)
*B82Y 30/00*  (2011.01)
(Continued)

(52) U.S. Cl.
CPC ........... *H01M 4/5835* (2013.01); *B82Y 30/00* (2013.01); *B82Y 40/00* (2013.01); *C01B 32/192* (2017.08);
(Continued)

(58) Field of Classification Search
CPC .... H01M 4/133; H01M 4/1393; H01M 4/362; H01M 4/364; H01M 4/366; H01M 4/583;
(Continued)

(56) References Cited

U.S. PATENT DOCUMENTS 4,302,518 A  11/1981  Goodenough et al.
4,668,595 A   5/1987  Yoshino et al.
(Continued)

FOREIGN PATENT DOCUMENTS

CN  101548418 A   9/2009
CN  101562248 A  10/2009
(Continued)

OTHER PUBLICATIONS

Sundaram.R et al., "Electrochemical Modification of Graphene", Adv. Mater. (Advanced Materials), Jul. 7, 2008, vol. 20, No. 16, pp. 3050-3053.
(Continued)

*Primary Examiner* — Christopher P Domone
(74) *Attorney, Agent, or Firm* — NIXON PEABODY LLP; Jeffrey L. Costellia

(57) ABSTRACT

The formation method of graphene includes the steps of forming a layer including graphene oxide over a first conductive layer; and supplying a potential at which the reduction reaction of the graphene oxide occurs to the first conductive layer in an electrolyte where the first conductive layer as a working electrode and a second conductive layer with a as a counter electrode are immersed. A manufacturing method of a power storage device including at least a
(Continued)

positive electrode, a negative electrode, an electrolyte, and a separator includes a step of forming graphene for an active material layer of one of or both the positive electrode and the negative electrode by the formation method.

14 Claims, 16 Drawing Sheets

Related U.S. Application Data continuation of application No. 17/983,140, filed on Nov. 8, 2022, now Pat. No. 11,735,731, which is a continuation of application No. 16/935,771, filed on Jul. 22, 2020, now abandoned, which is a continuation of application No. 16/599,944, filed on Oct. 11, 2019, now abandoned, which is a continuation of application No. 14/507,872, filed on Oct. 7, 2014, now Pat. No. 10,461,332, which is a continuation of application No. 13/629,645, filed on Sep. 28, 2012, now Pat. No. 8,883,351.

(51) Int. Cl.
| | | |
|---|---|---|
| B82Y 40/00 | (2011.01) | |
| C01B 32/192 | (2017.01) | |
| C01B 32/23 | (2017.01) | |
| H01G 9/042 | (2006.01) | |
| H01G 11/22 | (2013.01) | |
| H01G 11/32 | (2013.01) | |
| H01G 11/36 | (2013.01) | |
| H01M 4/04 | (2006.01) | |
| H01M 4/133 | (2010.01) | |
| H01M 4/139 | (2010.01) | |
| H01M 4/1393 | (2010.01) | |
| H01M 4/587 | (2010.01) | |
| H01M 4/62 | (2006.01) | |
| H01M 6/16 | (2006.01) | |
| H01M 10/0525 | (2010.01) | |
| H01M 10/0566 | (2010.01) | |

(52) U.S. Cl.
CPC ............. *C01B 32/23* (2017.08); *H01G 9/042* (2013.01); *H01G 11/22* (2013.01); *H01G 11/32* (2013.01); *H01G 11/36* (2013.01); *H01M 4/0438* (2013.01); *H01M 4/133* (2013.01); *H01M 4/139* (2013.01); *H01M 4/1393* (2013.01); *H01M 4/587* (2013.01); *H01M 4/62* (2013.01); *H01M 6/16* (2013.01); *H01M 10/0566* (2013.01); *H01M 10/0525* (2013.01); *Y02E 60/13* (2013.01)

(58) Field of Classification Search
CPC ...... H01M 4/587; H01M 4/625; H01M 4/663; H01M 4/665; H01M 4/666; H01M 4/667
See application file for complete search history.

(56) References Cited

U.S. PATENT DOCUMENTS

| | | | |
|---|---|---|---|
| 5,783,333 A | 7/1998 | Mayer | |
| 5,871,866 A | 2/1999 | Barker et al. | |
| 5,910,382 A | 6/1999 | Goodenough et al. | |
| 6,085,015 A | 7/2000 | Armand et al. | |
| 6,514,640 B1 | 2/2003 | Armand et al. | |
| 7,179,561 B2 | 2/2007 | Niu et al. | |
| 7,572,542 B2 | 8/2009 | Naoi | |
| 7,658,901 B2 | 2/2010 | Prud'Homme et al. | |
| 7,659,350 B2 | 2/2010 | Prud'Homme et al. | |
| 7,745,047 B2 | 6/2010 | Zhamu et al. | |
| 7,842,432 B2 | 11/2010 | Niu et al. | |
| 7,935,754 B2 | 5/2011 | Prud'Homme et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,047,248 B2 | 11/2011 | Prud'Homme et al. | |
| 8,048,214 B2 | 11/2011 | Prud'Homme et al. | |
| 8,048,931 B2 | 11/2011 | Prud'Homme et al. | |
| 8,048,950 B2 | 11/2011 | Prud'Homme et al. | |
| 8,053,508 B2 | 11/2011 | Korkut et al. | |
| 8,063,134 B2 | 11/2011 | Prud'Homme et al. | |
| 8,066,964 B2 | 11/2011 | Prud'Homme et al. | |
| 8,105,976 B2 | 1/2012 | Prud'Homme et al. | |
| 8,110,524 B2 | 2/2012 | Prud'Homme et al. | |
| 8,192,870 B2 | 6/2012 | Aksay et al. | |
| 8,257,867 B2 | 9/2012 | Liu et al. | |
| 8,278,011 B2 | 10/2012 | Zhu et al. | |
| 8,317,984 B2 | 11/2012 | Gilje | |
| 8,450,014 B2 | 5/2013 | Liu et al. | |
| 8,507,135 B2 | 8/2013 | Grupp et al. | |
| 8,557,442 B2 | 10/2013 | Liu et al. | |
| 8,563,169 B2 | 10/2013 | Liu et al. | |
| 8,835,046 B2 | 9/2014 | Liu et al. | |
| 8,883,351 B2 | 11/2014 | Todoriki et al. | |
| 8,986,870 B2 | 3/2015 | Yamazaki et al. | |
| 9,017,867 B2 | 4/2015 | Liu et al. | |
| 9,070,942 B2 | 6/2015 | Liu et al. | |
| 9,406,978 B2 | 8/2016 | Yamazaki et al. | |
| 10,461,332 B2 * | 10/2019 | Todoriki ........... | H01M 10/0566 |
| 2001/0010807 A1 | 8/2001 | Matsubara | |
| 2002/0102459 A1 | 8/2002 | Hosoya et al. | |
| 2002/0195591 A1 | 12/2002 | Ravet et al. | |
| 2006/0051671 A1 | 3/2006 | Thackeray et al. | |
| 2007/0009799 A1 | 1/2007 | Zheng | |
| 2007/0131915 A1 | 6/2007 | Stankovich et al. | |
| 2008/0048153 A1 | 2/2008 | Naoi | |
| 2008/0160409 A1 | 7/2008 | Ishida et al. | |
| 2008/0213671 A1 | 9/2008 | Kogetsu et al. | |
| 2008/0254296 A1 | 10/2008 | Handa et al. | |
| 2009/0110627 A1 * | 4/2009 | Choi ...................... | B82Y 40/00 |
| | | | 252/502 |
| 2009/0117467 A1 * | 5/2009 | Zhamu ................. | H01M 4/133 |
| | | | 429/231.95 |
| 2009/0123850 A1 | 5/2009 | Takeuchi et al. | |
| 2009/0253045 A1 | 10/2009 | Kotato et al. | |
| 2009/0305135 A1 | 12/2009 | Shi et al. | |
| 2010/0028773 A1 | 2/2010 | Hirota et al. | |
| 2010/0035093 A1 | 2/2010 | Ruoff et al. | |
| 2010/0055025 A1 | 3/2010 | Jang et al. | |
| 2010/0081057 A1 | 4/2010 | Liu et al. | |
| 2010/0105834 A1 | 4/2010 | Tour et al. | |
| 2010/0143798 A1 | 6/2010 | Zhamu et al. | |
| 2010/0176337 A1 | 7/2010 | Zhamu et al. | |
| 2010/0233532 A1 | 9/2010 | Hirota et al. | |
| 2010/0233538 A1 | 9/2010 | Nesper et al. | |
| 2010/0233546 A1 | 9/2010 | Nesper et al. | |
| 2010/0248034 A1 | 9/2010 | Oki et al. | |
| 2010/0291438 A1 | 11/2010 | Ahn et al. | |
| 2010/0301279 A1 | 12/2010 | Nesper et al. | |
| 2010/0303706 A1 | 12/2010 | Wallace et al. | |
| 2010/0308277 A1 | 12/2010 | Grupp | |
| 2010/0330421 A1 | 12/2010 | Cui et al. | |
| 2011/0012067 A1 | 1/2011 | Kay | |
| 2011/0033746 A1 | 2/2011 | Liu et al. | |
| 2011/0045347 A1 | 2/2011 | Liu et al. | |
| 2011/0052813 A1 * | 3/2011 | Ho .......................... | B82Y 30/00 |
| | | | 427/256 |
| 2011/0079748 A1 | 4/2011 | Ruoff et al. | |
| 2011/0111303 A1 | 5/2011 | Kung et al. | |
| 2011/0121240 A1 | 5/2011 | Amine et al. | |
| 2011/0136019 A1 | 6/2011 | Amiruddin et al. | |
| 2011/0159372 A1 | 6/2011 | Zhamu et al. | |
| 2011/0183180 A1 | 7/2011 | Yu et al. | |
| 2011/0227000 A1 | 9/2011 | Ruoff et al. | |
| 2011/0229795 A1 | 9/2011 | Niu et al. | |
| 2012/0021294 A1 | 1/2012 | Zhamu et al. | |
| 2012/0045692 A1 | 2/2012 | Takemura et al. | |
| 2012/0058397 A1 | 3/2012 | Zhamu et al. | |
| 2012/0063988 A1 | 3/2012 | Tour et al. | |

(56) References Cited

U.S. PATENT DOCUMENTS

| | | | |
|---|---|---|---|
| 2012/0064409 | A1 | 3/2012 | Zhamu et al. |
| 2012/0077095 | A1 | 3/2012 | Roumi et al. |
| 2012/0088084 | A1 | 4/2012 | Prud'Homme et al. |
| 2012/0088151 | A1 | 4/2012 | Yamazaki et al. |
| 2012/0088156 | A1 | 4/2012 | Nomoto et al. |
| 2012/0100402 | A1 | 4/2012 | Nesper et al. |
| 2012/0129736 | A1 | 5/2012 | Tour et al. |
| 2012/0142111 | A1 | 6/2012 | Tour et al. |
| 2012/0197051 | A1 | 8/2012 | Tour et al. |
| 2012/0214065 | A1 | 8/2012 | Yoshida et al. |
| 2012/0308884 | A1 | 12/2012 | Oguni et al. |
| 2012/0308891 | A1 | 12/2012 | Todoriki et al. |
| 2012/0315550 | A1 | 12/2012 | Liu et al. |
| 2013/0045156 | A1 | 2/2013 | Nomoto et al. |
| 2013/0071751 | A1 | 3/2013 | Tajima et al. |
| 2013/0084384 | A1 | 4/2013 | Yamakaji |
| 2013/0266859 | A1 | 10/2013 | Todoriki et al. |

FOREIGN PATENT DOCUMENTS

| | | | |
|---|---|---|---|
| CN | 101752561 | A | 6/2010 |
| CN | 101834312 | A | 9/2010 |
| CN | 101849302 | A | 9/2010 |
| CN | 102112393 | A | 6/2011 |
| CN | 102174702 | A | 9/2011 |
| CN | 102576877 | A | 7/2012 |
| EP | 2068385 | A | 6/2009 |
| EP | 2237346 | A | 10/2010 |
| EP | 2256087 | A | 12/2010 |
| EP | 2511973 | A | 10/2012 |
| JP | 08-037007 | A | 2/1996 |
| JP | 2002-110162 | A | 4/2002 |
| JP | 2003-238131 | A | 8/2003 |
| JP | 2006-265751 | A | 10/2006 |
| JP | 2009-511415 | | 3/2009 |
| JP | 2009-524567 | | 7/2009 |
| JP | 2009-176721 | A | 8/2009 |
| JP | 2010-219047 | A | 9/2010 |
| JP | 2010-248066 | A | 11/2010 |
| JP | 2010-275186 | A | 12/2010 |
| JP | 2011-018575 | A | 1/2011 |
| JP | 2011-500488 | | 1/2011 |
| JP | 2011-503804 | | 1/2011 |
| JP | 2011-048992 | A | 3/2011 |
| JP | 2011-517053 | | 5/2011 |
| JP | 2011-105569 | A | 6/2011 |
| JP | 2012-064571 | A | 3/2012 |
| JP | 2012-224526 | A | 11/2012 |
| JP | 2013-082606 | A | 5/2013 |
| KR | 2008-0080937 | A | 9/2008 |
| WO | WO-2006/062947 | | 6/2006 |
| WO | WO-2006/071076 | | 7/2006 |
| WO | WO-2007/047084 | | 4/2007 |
| WO | WO-2007/061945 | | 5/2007 |
| WO | WO-2009/061685 | | 5/2009 |
| WO | WO-2009/085015 | | 7/2009 |
| WO | WO-2009/127901 | | 10/2009 |
| WO | WO-2009/144600 | | 12/2009 |
| WO | WO-2010/014215 | | 2/2010 |
| WO | WO-2010/022164 | | 2/2010 |
| WO | WO-2010/096665 | | 8/2010 |
| WO | WO-2010/147859 | | 12/2010 |
| WO | WO-2010/147860 | | 12/2010 |
| WO | WO-2011/016889 | | 2/2011 |
| WO | WO-2011/019764 | | 2/2011 |
| WO | WO-2011/019765 | | 2/2011 |
| WO | WO-2011/041663 | | 4/2011 |
| WO | WO-2011/068750 | | 6/2011 |
| WO | WO-2011/069348 | | 6/2011 |
| WO | WO-2011/116369 | | 9/2011 |
| WO | WO-2011/141486 | | 11/2011 |
| WO | WO-2012/023464 | | 2/2012 |
| WO | WO-2012/048194 | | 4/2012 |
| WO | WO-2013/047630 | | 4/2013 |

OTHER PUBLICATIONS

Zhou.M et al., "Controlled Synthesis of Large-Area and Patterned Electrochemically Reduced Graphene Oxide Films", Chemistry a European Journal, May 14, 2009, vol. 15, No. 25, pp. 6116-6120.

Shao.Y et al., "Facile and controllable electrochemical reduction of graphene oxide and its applications", J. Mater. Chem. (Journal of Materials Chemistry), 2010, vol. 20, No. 4, pp. 743-748.

Su.F et al., "Flexible and planar graphene conductive additives for lithium-ion batteries", J. Mater. Chem. (Journal of Materials Chemistry), 2010, vol. 20, pp. 9644-9650.

Zhou.X et al., "Graphene modified LiFePO4 cathode materials for high power lithium ion batteries", J. Mater. Chem. (Journal of Materials Chemistry), 2011, vol. 21, pp. 3353-3358.

Yu.G et al., "Solution-Processed Graphene/MnO2 Nanostructured Textiles for High-Performance Electrochemical Capacitors", Nano Letters, 2011, vol. 11, No. 7, pp. 2905-2911.

Wang.Z et al., "Direct Electrochemical Reduction of Single-Layer Graphene Oxide and Subsequent Functionalization with Glucose Oxidase", J. Phys. Chem. C (The Journal of Physical Chemistry C), 2009, vol. 113, No. 32, pp. 14071-14075.

International Search Report (Application No. PCT/JP2012/074815) Dated Dec. 25, 2012.

Written Opinion (Application No. PCTJP2012/074815) Dated Dec. 25, 2012.

Mattevi.C et al., "Evolution of electrical, chemical, and structural properties of transparent and conducting chemically derived graphene thin films", Adv. Funct. Mater. (Advanced Functional Materials), Jun. 8, 2009, vol. 19, No. 16, pp. 2577-2583.

Zhang.H et al., "Vacuum-assisted synthesis of graphene from thermal exfoliation and reduction of graphite oxide", J. Mater. Chem. (Journal of Materials Chemistry), Apr. 14, 2011, vol. 21, No. 14, pp. 5392-5397.

Padhi.A et al., "Phospho-olivines as Positive-Electrode Materials for Rechargeable Lithium Batteries", J. Electrochem. Soc. (Journal of the Electrochemical Society), Apr. 1, 1997, vol. 144, No. 4, pp. 1188-1194.

Paek.S et al., "Enhanced Cyclic Performance and Lithium Storage Capacity of SnO2/Graphene Nanoporous Electrodes with Three-Dimensionally Delaminated Flexible Structure", Nano Letters, 2009, vol. 9, No. 1, pp. 72-75.

Wang.G et al., "Sn/graphene nanocomposite with 3D architecture for enhanced reversible lithium storage in lithium ion batteries", J. Mater. Chem. (Journal of Materials Chemistry), 2009, vol. 19, No. 44, pp. 8378-8384.

Wang.D et al., "Self-Assembled TiO2-Graphene Hybrid Nanostructures for Enhanced Li-Ion Insertion", ACS Nano, 2009, vol. 3, No. 4, pp. 907-914.

Todoriki.H et al., "High performance lithium ion battery using Graphene Net electrode", 222nd ECS Meeting Abstract, Oct. 7, 2012, p. 1014, ECS.

Dreyer.D et al., "The Chemistry of Graphene Oxide", Chem. Soc. Rev. (Chemical Society Reviews), Nov. 3, 2009, vol. 39, No. 1, pp. 228-240.

Park.S et al., "Hydrazine-reduction of graphite-and graphene oxide", Carbon, Mar. 15, 2011, vol. 49, No. 9, pp. 3019-3023, Elsevier.

Chinese Office Action (Application No. 201280047563.5) Dated Dec. 4, 2015.

Harima.Y et al., "Electrochemical reduction of graphene oxide in organic solvents", Electrochimica Acta, Apr. 4, 2011, vol. 56, No. 15, pp. 5363-5368.

Setodoi.S et al., "Electrochemical behaviors of graphene oxide and application to electrochemical double layer capacitor", Extended Abstracts II of 91st Annual Meeting of The Chemical Society of Japan, Mar. 11, 2011, vol. 91, No. 2, p. 513, CSJ(The Chemical Society of Japan).

Taiwanese Office Action (Application No. 101135873) Dated May 10, 2016.

Ganguly.A et al., "Probing the Thermal Deoxygenation of Graphene Oxide Using High-Resolution In Situ X-ray-Based Spectroscopies", 2011, pp. 1-36.

(56) References Cited

OTHER PUBLICATIONS

Taiwanese Office Action (Application No. 105125447) Dated Jan. 12, 2017.
Shearer.C et al., "Accurate thickness measurement of graphene", Nanotechnology, Feb. 18, 2016, vol. 27, No. 12, p. 125704, IOP Publishing.
Korean Office Action (Application No. 2014-7005059) Dated Oct. 2, 2018.
Taiwanese Office Action (Application No. 108146493) Dated Apr. 14, 2020.
Chinese Office Action (Application No. 201810081169.2) Dated Sep. 24, 2020.
Chinese Office Action (Application No. 201810081169.2) Dated Mar. 26, 2021.
Taiwanese Office Action (Application No. 109125846) Dated May 10, 2021.
Taiwanese Office Action (Application No. 109125846) Dated Feb. 17, 2022.
Ganguly.A et al., "Probing the Thermal Deoxygenation of Graphene Oxide Using High-Resolution In Situ X-ray-Based Spectroscopies", J. Phys. Chem. C (the Journal of Physical Chemistry C), Jul. 20, 2011, vol. 115, No. 34, pp. 17009-17019, ACS Publications.
Taiwanese Office Action (Application No. 112101359) Dated Oct. 11, 2023.
Compton.O et al., "Chemically Active Reduced Graphene Oxide with Tunable C/O Ratios", ACS Nano, Jun. 3, 2011, vol. 5, No. 6, pp. 4380-4391.
Taiwanese Office Action (Application No. 113113729) Dated Dec. 2, 2024.

\* cited by examiner

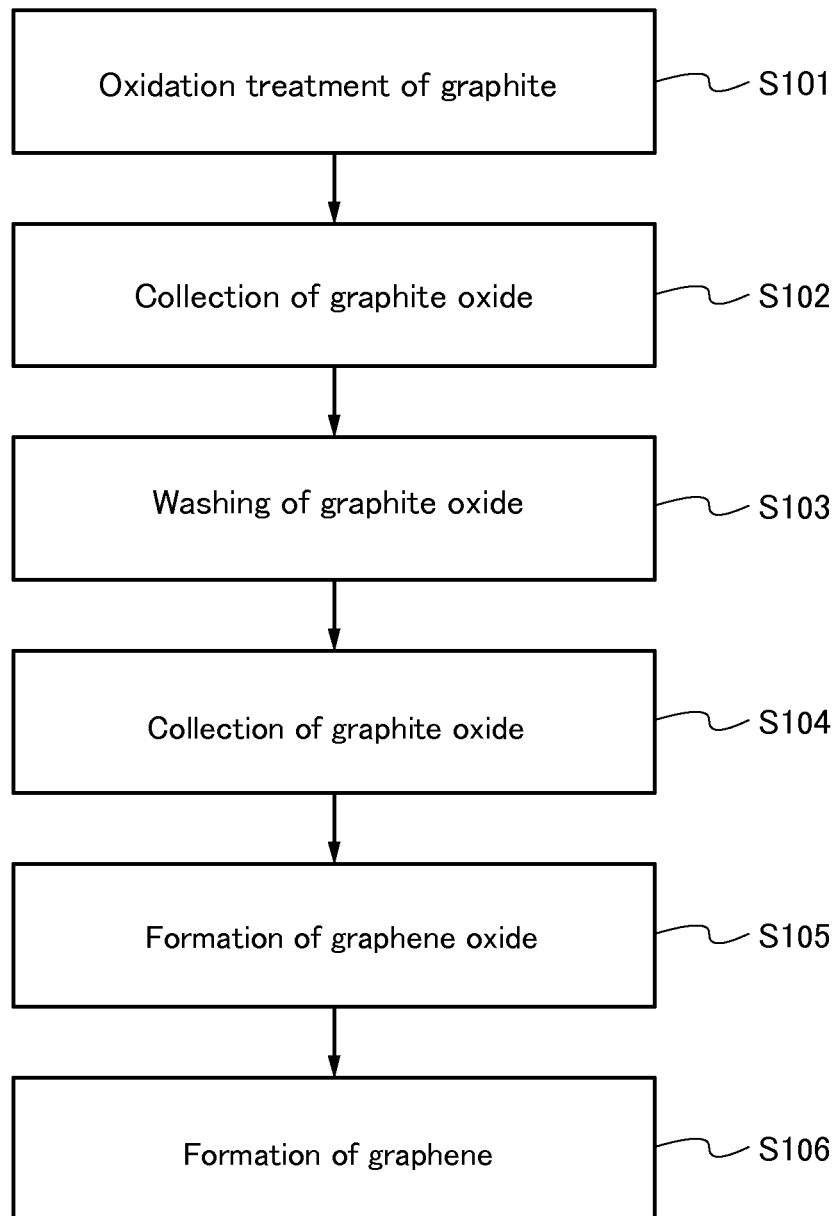

GRAPHENE AND POWER STORAGE DEVICE, AND MANUFACTURING METHOD THEREOF

TECHNICAL FIELD

The present invention relates to formation methods of graphene and an electrode including the graphene, and a manufacturing method of a power storage device including the electrode. The present invention also relates to graphene and an electrode which are formed by the formation methods and a power storage device which is manufactured by the manufacturing method. Note that a power storage device in this specification refers to every element and/or device having a function of storing electric power, such as a lithium primary battery, a lithium secondary battery, or a lithium-ion capacitor.

BACKGROUND ART

In recent years, attempts have been made to apply graphene to a variety of products because of its excellent electric characteristic of high conductivity and its excellent physical characteristics such as sufficient flexibility and high mechanical strength.

Application of graphene to power storage devices such as a lithium secondary battery and a lithium-ion capacitor is one of the attempts. For example, an electrode material can be coated with graphene to improve the conductivity of the electrode material for a lithium secondary battery.

As a method for forming graphene, a method of reducing graphite oxide or graphene oxide in the presence of a base is given. In order to form graphite oxide using the method for forming graphene, a method using sulfuric acid, nitric acid, and potassium chlorate as an oxidizer, a method using sulfuric acid and potassium permanganate as an oxidizer, a method using potassium chlorate and fuming nitric acid as an oxidizer, or the like can be employed (see Patent Document 1).

As a method of forming graphite oxide with the use of sulfuric acid and potassium permanganate as an oxidizer, the modified Hummers method is given. Here, the method of forming graphene by the modified Hummers method will be described with reference to FIG. 14.

Graphite is oxidized using an oxidizer such as potassium permanganate in a solvent; thus, a mixed solution 1 containing graphite oxide is formed. After that, in order to remove the remaining oxidizer in the mixed solution 1, hydrogen peroxide and water are added to the mixed solution 1, and a mixed solution 2 is formed (Step S101). Here, unreacted potassium permanganate is reduced by the hydrogen peroxide and then the reduced potassium permanganate reacts with sulfuric acid, whereby manganese sulfate is formed. Then, the graphite oxide is collected from the mixed solution 2 (Step S102). Then, the collected graphite oxide is washed with an acid solution in order to remove the oxidizer which remains in or is attached to the graphite oxide, and subsequently, the graphite oxide is washed with water (Step S103). Note that the washing Step S103 is performed repeatedly. After that, the graphite oxide is diluted with a large amount of water and centrifuged, and the graphite oxide from which an acid is separated is collected. (Step S104). Then, ultrasonic waves are applied to a mixed solution containing the collected graphite oxide and an oxidized carbon layer in the graphite oxide is separated, so that graphene oxide is formed (Step S105). Then, the graphene oxide is reduced, whereby graphene can be formed (Step S106).

For a method of forming graphene by reducing graphene oxide, heat treatment can be employed.

REFERENCE

[Patent Document 1] Japanese Published Patent Application No. 2011-500488

DISCLOSURE OF INVENTION

In some cases, the conductivity of graphene formed by reducing graphene oxide depends on the bonding state in the graphene.

In view of the above, an object of one embodiment of the present invention is to provide graphene which is formed from graphene oxide and has high conductivity and to provide a method for forming the graphene.

An electrode included in a power storage device includes a current collector and an active material layer. In a conventional electrode, an active material layer includes a conductive additive, binder, and/or the like as well as an active material. For this reason, it is difficult to efficiently increase only the weight of the active material in an electrode, and thus, it is difficult to increase the charge and discharge capacity per unit weight or volume of the electrode. Further, the conventional electrode also has a problem in that the binder included in the active material layer swells as it comes into contact with an electrolyte, so that the electrode is likely to be deformed and broken.

In view of the above problems, an object of one embodiment of the present invention is to provide a power storage device with high charge and discharge capacity per unit weight or volume of an electrode, high reliability, high durability, and the like and to provide a method for manufacturing the power storage device.

Oxides such as graphite oxide and graphene oxide can be reduced through heat treatment. In the present invention, however, graphene oxide is electrochemically reduced with electric energy to form graphene. In this specification, reduction caused by supplying a potential for promoting the reduction reaction of an active material layer may be referred to as electrochemical reduction.

In this specification, graphene refers to a one-atom-thick sheet of carbon molecules with a gap through which ions can pass and double bonds (also referred to as $sp^2$ bonds), or a stack of 2 to 100 layers of the sheets. The stack can also be referred to as multilayer graphene. Further, in the graphene, the proportion of an element other than hydrogen and carbon is preferably 15 at. % or lower, or the proportion of an element other than carbon is preferably 30 at. % or lower. Note that graphene to which an alkali metal such as potassium is added may be used. Thus, an analog of graphene is included in the category of the graphene.

Further, graphene oxide in this specification refers to graphene in which an oxygen atom is bonded to a six-membered ring or a many-membered ring each composed of carbon atoms. Specifically, graphene oxide in this specification refers to graphene in which an epoxy group, a carbonyl group such as a carboxyl group, a hydroxyl group, or the like is bonded to a six-membered ring or a many-membered ring each composed of carbon atoms. In graphene oxide, graphene oxide salt is formed in some cases depending on a formation method. The graphene oxide salt refers to, for example, a salt in which ammonia, amine, an alkali metal, or the like reacts with an epoxy group, a carbonyl group such as a carboxyl group, or a hydroxyl group bonded to a six-membered ring or a many-membered ring each composed of carbon atoms. In this speciation, "graphene oxide" includes "graphene oxide salt" in its category. Note that graphene oxide and graphene oxide salt each include one sheet or a stack of 2 to 100 layers of the sheets, and the stack can also be referred to as multilayer graphene oxide or multilayer graphene oxide salt.

One embodiment of the present invention is a method for forming graphene. The method includes the steps of forming a layer including graphene oxide over a first conductive layer; and supplying a potential at which the reduction reaction of the graphene oxide occurs to the first conductive layer in an electrolyte in which the first conductive layer as a working electrode and a second conductive layer as a counter electrode are immersed, so that graphene is formed. Specifically, the potential supplied to the first conductive layer is set to 1.6 V to 2.4 V inclusive (the redox potential of lithium is used as a reference potential), a potential at which the reduction reaction of the graphene oxide occurs, and the graphene oxide is reduced to form graphene. Note that the case where the redox potential of lithium is used as a reference potential may be hereinafter denoted as "vs. Li/Li$^+$".

One embodiment of the present invention is a method for forming graphene. The method includes the steps of forming a layer including graphene oxide over a first conductive layer; and sweeping the potential of the first conductive layer so that it includes at least a potential at which the reduction reaction of the graphene oxide occurs in an electrolyte in which the first conductive layer as a working electrode and a second conductive layer as a counter electrode are immersed and reducing graphene oxide, so that graphene is formed. Specifically, as described above, the potential of the first conductive layer is swept so as to include the range of 1.4 V to 2.6 V (vs. Li/Li$^+$), a potential at which the graphene oxide can be reduced, preferably the range of 1.6 V to 2.4 V (vs. Li/Li$^+$). Further, the potential of the first conductive layer may be periodically swept so as to include the range. Periodical potential sweeping enables sufficient reduction of the graphene oxide.

A power storage device can be manufactured using any of the above methods. One embodiment of the present invention is a method for manufacturing a power storage device including at least a positive electrode, a negative electrode, an electrolyte, and a separator. The method includes the steps of forming an active material layer including at least an active material and graphene oxide, over a current collector, in one of or both the positive electrode and the negative electrode; and supplying a potential at which the reduction reaction of the graphene oxide occurs to the current collector, so that graphene is formed. Specifically, the potential supplied to the current collector in one of or both the positive electrode and the negative electrode is set to 1.4 V to 2.6 V inclusive (vs. Li/Li$^+$), preferably 1.6 V to 2.4 V inclusive (vs. Li/Li$^+$), and the graphene oxide is reduced to form graphene.

One embodiment of the present invention is a method for manufacturing an electrode and a power storage device including the electrode. The method for manufacturing the electrode includes the steps of forming an active material layer including at least an active material and graphene oxide over a current collector; and sweeping the potential of the current collector so that it includes at least a potential at which the reduction reaction of the graphene oxide occurs and reducing the graphene oxide, so that graphene is formed. Specifically, as described above, the potential of the current collector is swept so as to include the range of 1.4 V to 2.6 V (vs. Li/Li$^+$), a potential at which the graphene oxide can be reduced, preferably the range of 1.6 V to 2.4 V (vs. Li/Li$^+$). At this time, graphene is formed on a surface of the active material or in the active material layer. The potential of the current collector may be periodically swept so as to include the range. Periodical sweeping of the potential of the current collector enables sufficient reduction of the graphene oxide in the active material layer, for example.

In graphene formed by the above method for forming graphene, the proportions of carbon atoms and oxygen atoms, which are measured by X-ray photoelectron spectroscopy (XPS), are 80% to 90% inclusive and 10% to 20% inclusive, respectively. Further, in the graphene, the proportion of sp$^2$-bonded carbon atoms of the carbon atoms measured by XPS is 50% to 80% inclusive, preferably 60% to 70% inclusive or 70% to 80% inclusive, i.e., 60% to 80% inclusive.

Note that one embodiment of the present invention includes a power storage device which includes the graphene in one of or both a positive electrode and a negative electrode.

According to one embodiment of the present invention, graphene which has a higher proportion of C(sp$^2$)-C(sp$^2$) double bonds and higher conductivity than graphene formed through heat treatment and a manufacturing method of the graphene can be provided. Moreover, a power storage device whose charge and discharge capacity per unit weight, reliability, and durability are high and a manufacturing method of the power storage device can be provided.

BRIEF DESCRIPTION OF DRAWINGS

In the accompanying drawings:

FIG. 14 illustrates a conventional formation method of graphene;

BEST MODE FOR CARRYING OUT THE INVENTION

Figure 1A:
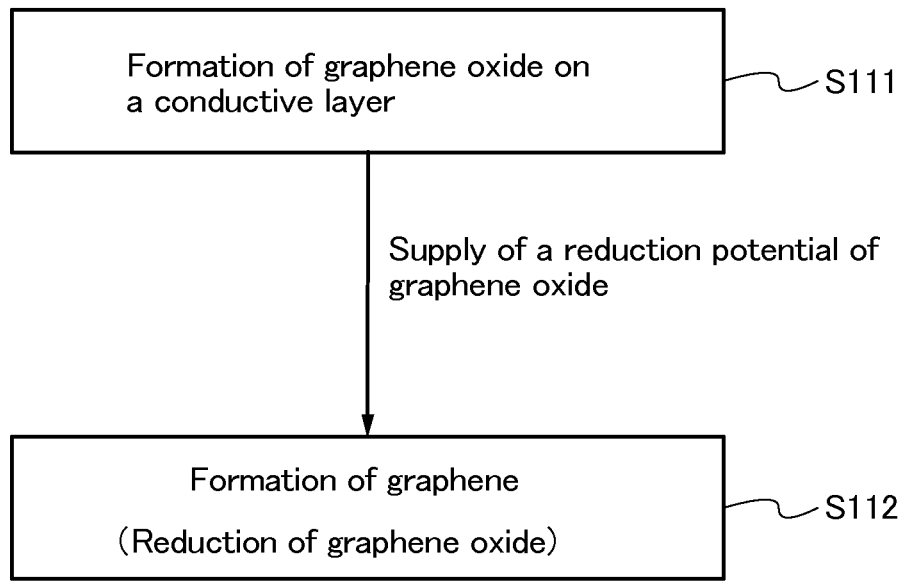
FIG. 1A illustrates a formation method of graphene of one embodiment of the present invention.

Embodiments and examples of the present invention will be described below with reference to the drawings. Note that the present invention is not limited to the following description, and it will be easily understood by those skilled in the art that various changes and modifications can be made without departing from the spirit and scope of the present invention. Thus, the present invention should not be interpreted as being limited to the following description of the embodiments and examples. In description using the drawings for reference, in some cases, common reference numerals are used for the same portions in different drawings. Further, in some cases, the same hatching patterns are applied to similar portions, and the similar portions are not necessarily designated by reference numerals.

Embodiment 1

Figure 1B:
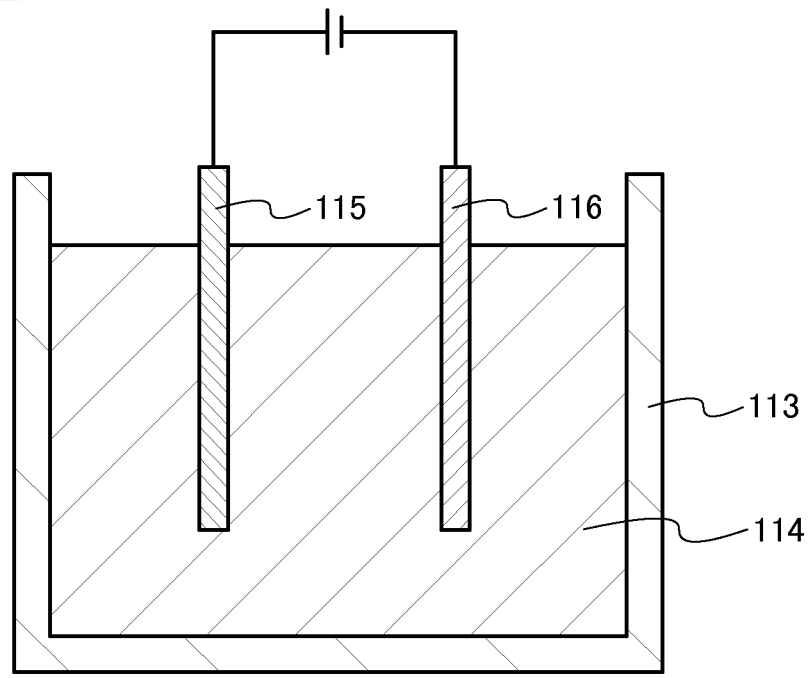
FIG. 1B illustrates an apparatus used for forming the graphene.

In this embodiment, a method for forming graphene of one embodiment of the present invention will be described below with reference to FIGS. 1A and 1B. FIG. 1A is a flow chart showing a process of forming graphene, and FIG. 1B is a schematic view of an apparatus used to form graphene.

According to the method for forming graphene of one embodiment of the present invention, to form graphene, graphene oxide is not reduced through heat treatment but electrochemically reduced with electric energy.

<Step S111>

In Step S111 shown in FIG. 1A, a layer including graphene oxide is formed on a surface of a conductive layer. For example, a dispersion liquid containing graphene oxide is applied to the conductive layer. As the dispersion liquid containing graphene oxide, a commercial product or a dispersion liquid obtained by dispersing graphene oxide formed by the method described with reference to FIG. 14, or the like, in a solvent may be used. Alternatively, a dispersion liquid obtained by dispersing graphene oxide (graphene oxide salt) formed by the following method in a solvent may be used.

The conductive layer can be formed using any material as long as the material has conductivity. For example, a metal material such as aluminum (Al), copper (Cu), nickel (Ni), or titanium (Ti) or an alloy material containing some of the above metal materials can be used. As the alloy material, for example, an Al—Ni alloy and an Al—Cu alloy can be given. The conductive layer can have a foil shape, a plate shape, a net shape, or the like as appropriate, and the metal material or the alloy material which is formed over a substrate and separated may be used as the conductive layer.

As a method of applying the dispersion liquid containing graphene oxide to the conductive layer, a coating method, a spin coating method, a dip coating method, a spray coating method, and the like can be given. Alternatively, these methods may be combined as appropriate. For example, after the dispersion liquid containing graphene oxide is applied to the conductive layer by a dip coating method, the conductive layer is rotated as in a spin coating method, so that the evenness of the thickness of the applied dispersion liquid containing graphene oxide can be improved.

After the dispersion liquid containing graphene oxide is applied to the conductive layer, the solvent in the dispersion liquid is removed. For example, drying is performed in vacuum for a certain period of time to remove the solvent from the dispersion liquid containing graphene oxide which is applied to the conductive layer. Note that time needed for vacuum drying depends on the amount of applied dispersion liquid. The vacuum drying may be performed while heating is performed as long as the graphene oxide is not reduced. For example, to make the thickness of the graphene oxide after Step S111 approximately 10 µm, it is preferable to perform vacuum drying for approximately one hour while the conductive layer is heated at a temperature higher than or equal to room temperature and lower than or equal to 100° C. and to perform vacuum drying at room temperature for approximately one hour.

<Step S112>

Next, the graphene oxide formed on the conductive layer is reduced to form graphene. In this step, the graphene oxide is electrochemically reduced using electric energy as describe above. When this step is schematically described, in this step, a closed circuit is formed with the use of the conductive layer provided with the graphene oxide, which is obtained in Step S111, and a potential at which the reduction reaction of the graphene oxide occurs or a potential at which the graphene oxide is reduced is supplied to the conductive layer, so that the graphene oxide is reduced to form graphene. Note that in this specification, a potential at which the reduction reaction of the graphene oxide occurs or a potential at which the graphene oxide is reduced is referred to as the reduction potential.

A method for reducing the graphene oxide will be specifically described with reference to FIG. 1B. A container 113 is filled with an electrolyte 114, and a conductive layer 115 provided with the graphene oxide and a counter electrode 116 are put in the container 113 so as to be immersed in the electrolyte 114. In this step, an electrochemical cell (open circuit) is formed with the use of at least the counter electrode 116 and the electrolyte 114 besides the conductive layer 115 provided with the graphene oxide, which is obtained in Step S111, as a working electrode, and the reduction potential of the graphene oxide is supplied to the conductive layer 115 (working electrode), so that the graphene oxide is reduced to form graphene. Note that an aprotic organic solvent such as ethylene carbonate or diethyl carbonate can be used as the electrolyte 114. Note that the reduction potential to be supplied is a reduction potential in the case where the potential of the counter electrode 116 is used as a reference potential or a reduction potential in the case where a reference electrode is provided in the electrochemical cell and the potential of the reference electrode is used as a reference potential. For example, when the counter electrode 116 and the reference electrode are each made of lithium metal, the reduction potential to be supplied is a reduction potential determined relative to the redox potential of the lithium metal (vs. Li/Li$^+$). Through this step, reduction current flows through the electrochemical cell (closed circuit) when the graphene oxide is reduced. Thus, to examine whether the graphene oxide is reduced, the reduction current needs to be checked sequentially; the state where the reduction current is below a certain value (where there is no peak corresponding to the reduction current) is regarded as the state where the graphene oxide is reduced (where the reduction reaction is completed).

In controlling the potential of the conductive layer 115 in this step, the potential of the conductive layer 115 may be fixed to the reduction potential of the graphene oxide or may be swept so as to include the reduction potential of the graphene oxide. Further, the sweeping may be periodically repeated like in cyclic voltammetry. Although there is no limitation on the sweep rate of the potential of the conductive layer 115, it is preferably 0.005 mV/s to 1 mV/s inclusive. Note that the potential of the conductive layer 115 may be swept either from a higher potential to a lower potential or from a lower potential to a higher potential.

Although the reduction potential of the graphene oxide slightly varies depending on the structure of the graphene oxide (e.g., the presence or absence of a functional group and formation of graphene oxide salt) and the way to control the potential (e.g., the sweep rate), it is approximately 2.0 V (vs. Li/Li$^+$). Specifically, the potential of the conductive layer 115 may be controlled so as to fall within the range of 1.4 V to 2.6 V (vs. Li/Li$^+$), preferably the range of 1.6 V to 2.4 V (vs. Li/Li$^+$). The details of the reduction potential of the graphene oxide will be described in examples below.

Through the above steps, the graphene can be formed on the conductive layer 115.

In the graphene formed by the method for forming graphene of one embodiment of the present invention, the proportions of carbon atoms and oxygen atoms, which are measured by XPS, are 80% to 90% inclusive and 10% to 20% inclusive, respectively. The proportion of sp$^2$-bonded carbon atoms of the carbon atoms is 50% to 80% inclusive, preferably 60% to 70% inclusive or 70% to 80% inclusive, i.e., 60% to 80% inclusive.

As a method for reducing graphene oxide, other than a method of electrochemical reduction with electric energy, a method of causing reduction by releasing oxygen atoms in graphene oxide as carbon dioxide through heat treatment (also referred to as thermal reduction). The graphene of one embodiment of the present invention is different from graphene formed by thermal reduction in at least the following points. Since the graphene of one embodiment of the present invention is formed by electrochemically reducing the graphene oxide with electric energy, the proportion of C(sp$^2$)-C(sp$^2$) double bonds is higher than that in graphene formed by thermal reduction. Thus, the graphene of one embodiment of the present invention has more π electrons which are not localized in a particular position and are broadly conducive to carbon-carbon bonds than graphene formed by thermal reduction, which suggests that the graphene of one embodiment of the present invention has higher conductivity than graphene formed by thermal reduction.

In the method described with reference to FIG. 14 as an example of a method for forming graphene oxide which can be employed in Step S111, a large amount of water is necessary in Step S103, the step of washing graphene oxide. When Step S103 is repeated, acid can be removed from graphite oxide. However, when the acid content thereof becomes low, it is difficult to separate the graphite oxide, which is a precipitate, and acid contained in a supernatant fluid; accordingly, the yield of the graphite oxide may probably be low, leading to a lower yield of graphene.

Here, a method for forming graphene oxide which is different from the method described with reference to FIG. 14 in Step S111 will be described.

Figure 2:
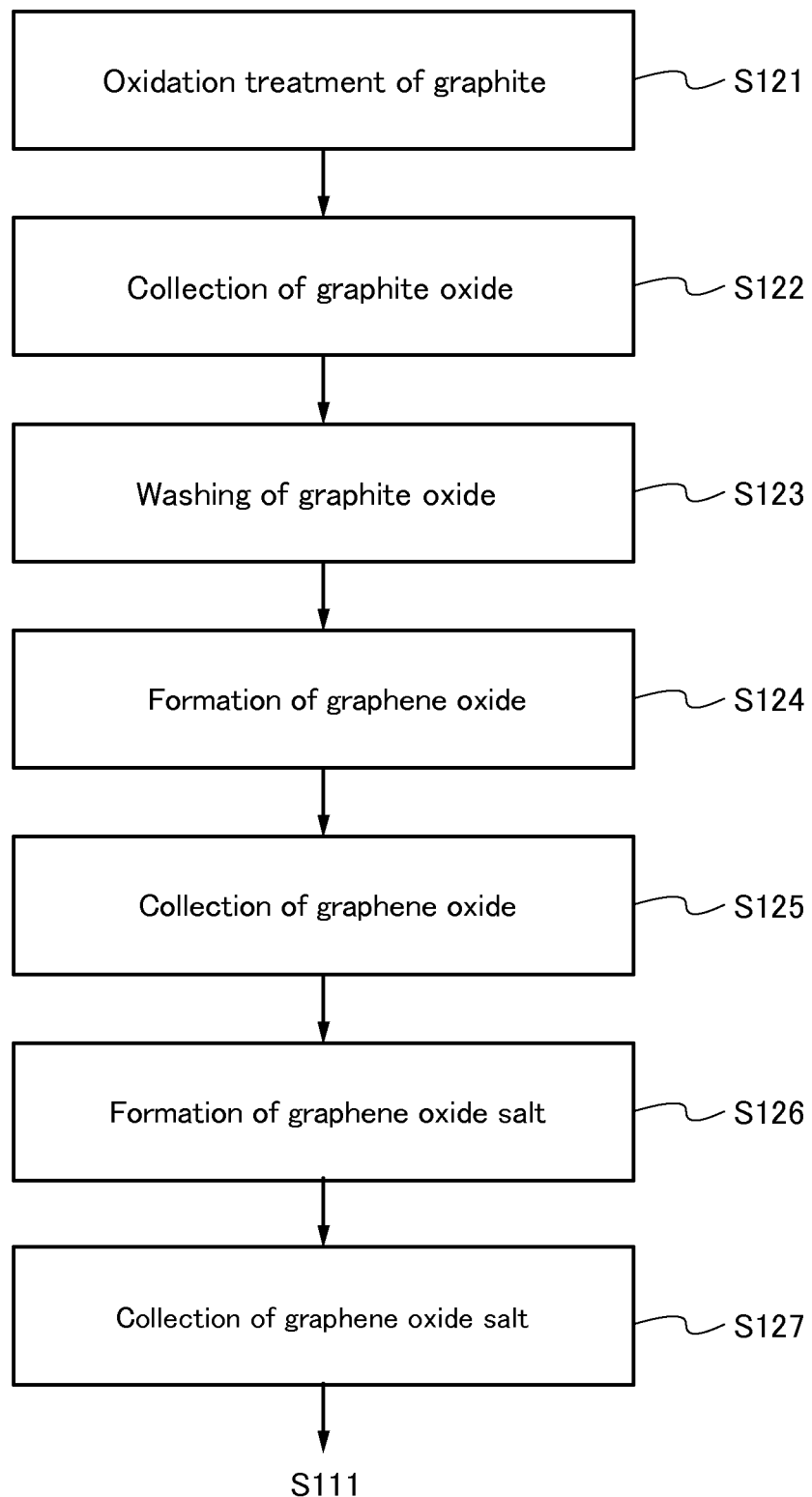
FIG. 2 illustrates a formation method of graphene oxide of one embodiment of the present invention.

FIG. 2 is a flow chart showing a process of forming graphene oxide (or graphene oxide salt).

<Oxidation Treatment of Graphite>

As shown in Step S121, graphite is oxidized with an oxidizer to form graphite oxide.

As an oxidizer, sulfuric acid, nitric acid and potassium chlorate; sulfuric acid and potassium permanganate; or potassium chlorate and fuming nitric acid are used. Here, graphite is oxidized by mixing graphite with sulfuric acid and potassium permanganate. Further, water is added thereto, whereby a mixed solution 1 containing the graphite oxide is formed.

After that, in order to remove the remaining oxidizer, hydrogen peroxide and water may be added to the mixed solution 1. Unreacted potassium permanganate is reduced by the hydrogen peroxide and then the reduced potassium permanganate is reacted with sulfuric acid, whereby manganese sulfate can be formed. Since the manganese sulfate is aqueous, it can be separated from the graphite oxide insoluble in water.

<Collection of Graphite Oxide>

Next, as shown in Step S122, the graphite oxide is collected from the mixed solution 1. The mixed solution 1 is subjected to at least one of filtration, centrifugation, and the like, so that a precipitate 1 containing the graphite oxide is collected from the mixed solution 1. Note that the precipitate 1 contains unreacted graphite in some cases.

<Washing of Graphite Oxide>

Next, as shown in Step S123, a metal ion and a sulfate ion are removed from the precipitate 1 containing the graphite oxide with an acid solution. Here, metal ion derived from the oxidizer, which is contained in the graphite oxide, are dissolved in the acid solution, whereby the metal ion and sulfate ion can be removed from the graphite oxide.

Thus, the use of an acid solution for the washing of the graphite oxide can increase the yields of graphene oxide and graphene oxide salt. For this reason, the method for forming graphene oxide in FIG. 2 can increase the productivity of graphene oxide, further, the productivity of graphene.

Typical examples of the acid solution include hydrochloric acid, dilute sulfuric acid, and nitric acid. Note that the graphite oxide is preferably washed with a highly-volatile acid typified by hydrochloric acid because the remaining acid solution is easily removed in a subsequent drying step.

As a method for removing a metal ion and a sulfate ion from the precipitate 1, there are a method in which the precipitate 1 and an acid solution are mixed and then a mixed solution is subjected to at least one of filtration, centrifugation, dialysis, and the like; a method in which the precipitate 1 is provided over filter paper and then an acid solution is poured on the precipitate 1; and the like. Here, the precipitate 1 is provided over filter paper, a metal ion and a sulfate ion are removed from the precipitate 1 by washing with the acid solution, and a precipitate 2 containing the graphite oxide is collected. Note that the precipitate 2 contains unreacted graphite in some cases.

<Formation of Graphene Oxide>

Next, as shown in Step S124, the precipitate 2 is mixed with water and a mixed solution 2 in which the precipitate 2 is dispersed is formed. Then, the graphite oxide contained in the mixed solution 2 is separated to form graphene oxide. Examples of a method for separating the graphite oxide to form graphene oxide include application of ultrasonic waves and mechanical stirring. Note that the mixed solution in which the graphene oxide is dispersed is a mixed solution 3.

The graphene oxide formed through this process contains six-membered rings each composed of carbon atoms, which are connected in the planar direction, and many-membered rings such as a seven-membered ring, an eight-membered ring, a nine-membered ring, and a ten-membered ring. Note that the many-membered ring is formed when a carbon bond in part of a six-membered ring composed of carbon atoms is broken and the broken carbon bond is bonded to a carbon skeleton ring so that the number of carbon atoms in the carbon skeleton ring increases. A region surrounded with carbon atoms in the many-membered ring becomes a gap. An epoxy group, a carbonyl group such as a carboxyl group, a hydroxyl group, or the like is bonded to a part of the carbon atoms in the six-membered ring and the many-membered ring. Note that instead of the dispersed graphene oxide, multilayer graphene oxide may be dispersed.

<Collection of Graphene Oxide>

Next, as shown in Step S125, the mixed solution 3 is subjected to at least one of filtration, centrifugation, and the like, whereby a mixed solution containing the graphene oxide and a precipitate 3 containing the graphite are separated from each other and the mixed solution containing the graphene oxide is collected. Note that the mixed solution containing the graphene oxide is a mixed solution 4. In particular, graphene oxide containing a carbonyl group is ionized and different graphene oxides are more likely to be dispersed because hydrogen is ionized in a mixed solution having a polarity.

The mixed solution 4 formed through the above step can be used as the dispersion liquid used in Step S111 shown in FIG. 1A.

The mixed solution 4 may contain not a few impurities; thus, it is preferable to purify the graphene oxide contained in the mixed solution 4 formed in Step S125 in order to increase the purity of graphene formed by the method for forming graphene of one embodiment of the present invention. Specifically, it is preferable to perform Steps S126 and S127 after Step S125. Steps S126 and S127 will be described below.

<Formation of Graphene Oxide Salt>

As shown in Step S126, after a basic solution is mixed into the mixed solution 4 to form graphene oxide salt, an organic solvent is added, and a mixed solution 5 in which the graphene oxide salt is precipitated as a precipitate 4 is formed.

As the basic solution, it is preferable to use a mixed solution which contains a base that reacts with the graphene oxide in a neutralization reaction without removing an oxygen atom bonded to a carbon atom of the grapheme oxide by reducing the graphene oxide. Typical examples of the basic solution include an aqueous sodium hydroxide solution, an aqueous potassium hydroxide solution, an aqueous ammonia solution, a methylamine solution, an ethanolamine solution, a dimethylamine solution, and trimethylamine solution.

The organic solvent is used to precipitate the graphene oxide salt; thus, acetone, methanol, ethanol, or the like is typically used as the organic solvent.

<Collection of Graphene Oxide Salt>

Next, as shown in Step S127, the mixed solution 5 is subjected to at least one of filtration, centrifugation, and the like, whereby the solvent and the precipitate 4 containing the graphene oxide salt are separated from each other, and the precipitate 4 containing the graphene oxide salt is collected.

Next, the precipitate 4 is dried to yield the graphene oxide salt.

When a suspension formed by dispersing the graphene oxide salt formed through the above steps in a solvent is used as the dispersion liquid in Step S111 shown in FIG. 1A, graphene formed by the method for forming graphene of one embodiment of the present invention can have higher purity.

Figure 3:
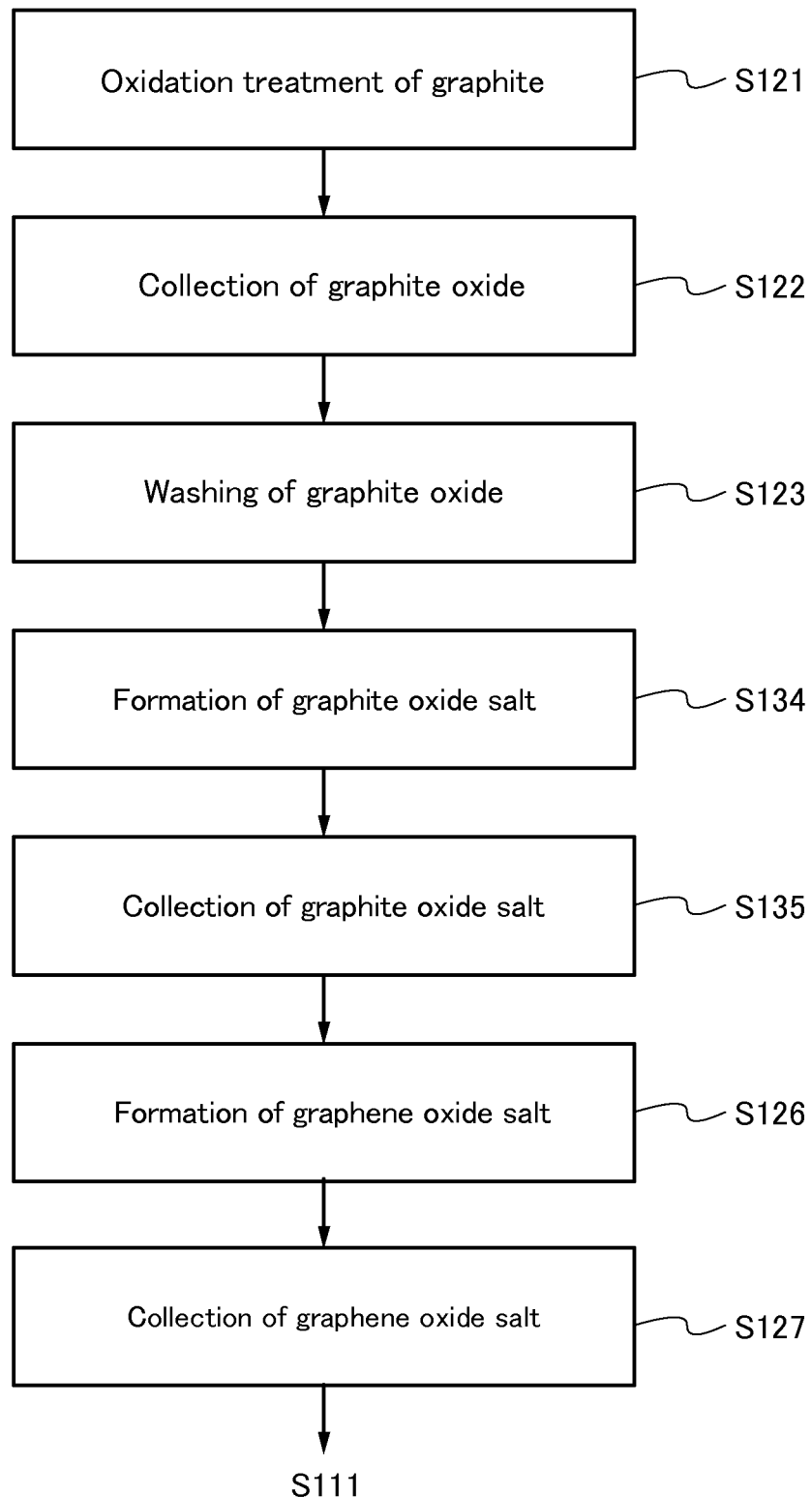
FIG. 3 illustrates a formation method of graphene oxide of one embodiment of the present invention.

Note that in a step following Step S123 in FIG. 2, not graphene oxide but graphite oxide salt may be formed (Step S134), the graphite oxide salt may be collected (Step S135), and then graphene oxide salt may be formed (see FIG. 3).

Step S134 is as follows. The precipitate 2 obtained in Step S123 is mixed with water, and then a basic solution is mixed into the mixture to form graphite oxide salt. After that, an organic solvent is added to the graphite oxide salt, and a mixed solution in which the graphite oxide salt is precipitated is formed. The basic solution can be selected from those used in Step S126, and the organic solvent can be selected from those used in Step S126.

In Step S135, the mixed solution in which the graphite oxide salt obtained in Step S134 is precipitated is subjected to at least one of filtration, centrifugation, and the like, whereby the organic solvent and the precipitate containing the graphite oxide salt are separated from each other, and the precipitate containing the graphite oxide salt is collected.

The other steps in the method for forming graphene oxide salt in FIG. 3 are the same as those shown in FIG. 2.

According to this embodiment, graphene which has a higher proportion of $C(sp^2)$-$C(sp^2)$ double bonds and higher conductivity than graphene formed through heat treatment can be formed.

This embodiment can be implemented in appropriate combination with any of the other embodiments.

Embodiment 2

In this embodiment, a power storage device of one embodiment of the present invention will be described. Specifically, a power storage device including an electrode formed by the formation method of graphene, which is described in Embodiment 1, will be described. Note that in this embodiment, description will be given assuming that the power storage device of one embodiment of the present invention is a lithium secondary battery.

First, a positive electrode 311 will be described.

Figure 4A:
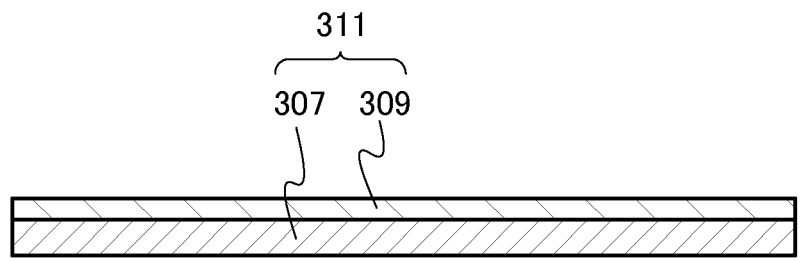
FIGS. 4A to 4C illustrate a positive electrode of one embodiment of the present invention.

FIG. 4A is a cross-sectional view of a positive electrode 311. In the positive electrode 311, a positive electrode active material layer 309 is formed over a positive electrode current collector 307. The positive electrode active material layer 309 includes at least a positive electrode active material 321 and graphene 323 (not illustrated) and may further include binder, a conductive additive, and/or the like.

Note that an active material refers to a material that relates to insertion and extraction of ions serving as carriers (hereinafter referred to as carrier ions) in a power storage device. Thus, the active material and the active material layer are distinguished.

As the positive electrode current collector 307, a material having high conductivity such as platinum, aluminum, copper, titanium, or stainless steel can be used. The positive electrode current collector 307 can have a foil shape, a plate shape, a net shape, or the like as appropriate.

As a material of a positive electrode active material 321 contained in the positive electrode active material layer 309, a lithium compound such as $LiFeO_2$, $LiCoO_2$, $LiNiO_2$, or $LiMn_2O_4$, or $V_2O_5$, $Cr_2O_5$, $MnO_2$, or the like can be used.

Alternatively, an olivine-type lithium-containing phosphate ($LiMPO_4$ (general formula) (M is one or more of Fe(II), Mn(II), Co(II), and Ni(II))) can be used for the positive electrode active material 321. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\le1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\le1$, $0<c<1$, $0<d<1$, and $0<e<1$), and $LiFe_fNi_gCo_hMn_iPO_4$ ($f+g+h+i\le1$, $0<f<1$, $0<g<1$, $0<h<1$, and $0<i<1$).

Alternatively, a lithium-containing silicate such as $Li_2MSiO_4$ (general formula) (M is one or more of Fe(II), Mn(II), Co(II), and Ni(II)) can be used for the positive electrode active material 321. Typical examples of the general formula $Li_2MSiO_4$ which can be used as a material are lithium compounds such as $Li_2FeSiO_4$, $Li_2NiSiO_4$, $Li_2CoSiO_4$, $Li_2MnSiO_4$, $Li_2Fe_kNi_lSiO_4$, $Li_2Fe_kCo_lSiO_4$, $Li_2Fe_kMn_lSiO_4$, $Li_2Ni_kCo_lSiO_4$, $Li_2Ni_kMn_lSiO_4$ ($k+l\le1$, $0<k<1$, and $0<l<1$), $Li_2Fe_mNi_nCo_qSiO_4$, $Li_2Fe_mNi_nMn_qSiO_4$, $Li_2Ni_mCo_nMn_qSiO_4$ ($m+n+q\leq1$, $0<m<1$, $0<n<1$, and $0<q<1$), and $Li_2Fe_rNi_sCo_tMn_uSiO_4$ ($r+s+t+u\leq1$, $0<r<1$, $0<s<1$, $0<t<1$, and $0<u<1$).

In the case where carrier ions are alkali metal ions other than lithium ions, alkaline-earth metal ions, beryllium ions, or magnesium ions, the positive electrode active material 321 may contain a compound obtained by substituting an alkali metal which is the same kind as a metal of the carrier ions (e.g., sodium or potassium), an alkaline-earth metal (e.g., calcium, strontium, or barium), beryllium, or magnesium for lithium in the lithium compound.

Figure 4B:
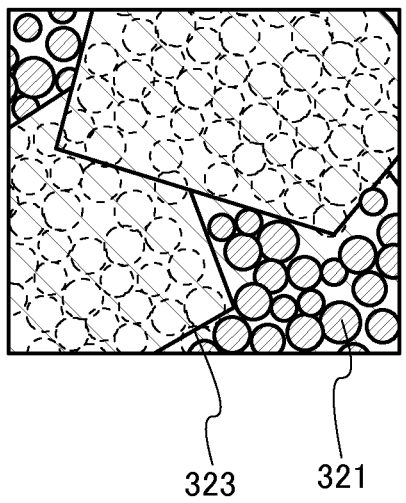

As illustrated in FIG. 4B, which is a plan view of part of the positive electrode active material layer 309, the positive electrode active material layer 309 includes positive electrode active materials 321 which are particles capable of occluding and releasing carrier ions, and graphenes 323 which cover a plurality of particles of the positive electrode active materials 321 and at least partly surround the plurality of particles of the positive electrode active materials 321. Further, in the positive electrode active material layer 309 in the plan view, the different graphenes 323 cover surfaces of the plurality of particles of the positive electrode active materials 321. Note that the positive electrode active materials 321 may be exposed in part of the positive electrode active material layer 309.

The size of the particle of the positive electrode active material 321 is preferably 20 nm to 100 nm inclusive. Note that the size of the particle of the positive electrode active material 321 is preferably smaller so that the surface area of the positive electrode active materials 321 is increased and the distance of electrons (and carrier ions) transfer is shortened, because electrons (and carrier ions) transfer in the positive electrode active material layer 309.

Sufficient characteristics of a power storage device can be obtained even when surfaces of the positive electrode active materials 321 are not coated with a carbon film; however, it is preferable to use both the graphene and the positive electrode active material coated with a carbon film because current flows between the positive electrode active materials 321 by hopping conduction.

Figure 4C:
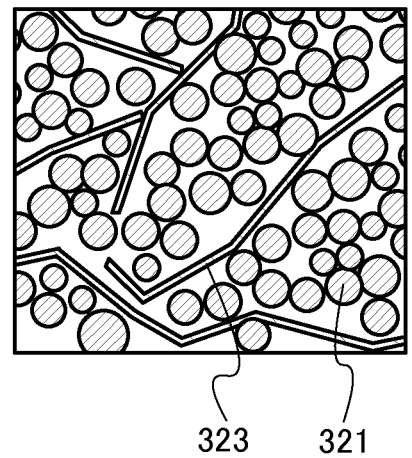

FIG. 4C is a cross-sectional view of part of the positive electrode active material layer 309 in FIG. 4B. FIG. 4C illustrates the positive electrode active materials 321 and the graphenes 323 which cover the positive electrode active materials 321 in the positive electrode active material layer 309 in the plan view. The graphenes 323 are observed to have linear shapes in cross section. One graphene or plural graphenes overlap with the plurality of particles of the positive electrode active materials 321, or the plurality of particles of the positive electrode active materials 321 are at least partly surrounded with one graphene or plural graphenes. Note that the graphene 323 has a bag-like shape, and the plurality particles of the positive electrode active materials are at least partly surrounded with the bag-like portion in some cases. The graphene partly has openings where the positive electrode active materials 321 are exposed in some cases.

The desired thickness of the positive electrode active material layer 309 is determined in the range of 20 μm to 100 μm. It is preferable to adjust the thickness of the positive electrode active material layer 309 as appropriate so that a crack and separation are not caused.

The positive electrode active material layer 309 may contain a known conductive additive such as acetylene black particles having a volume 0.1 to 10 times as large as that of the graphene, or carbon particles having a one-dimensional expansion (e.g., carbon nanofibers), and/or a known binder such as polyvinylidene difluoride (PVDF).

As an example of the positive electrode active material, a material whose volume is expanded by occlusion of carrier ions is given. When such a material is used as the positive electrode active material, the positive electrode active material layer gets vulnerable and is partly collapsed by charge and discharge, resulting in lower reliability (e.g., inferior cycle characteristics) of a power storage device. However, the graphene 323 covering the periphery of the positive electrode active materials 321 in the positive electrode in the power storage device of one embodiment of the present invention can prevent the positive electrode active materials 321 from being pulverized and can prevent the positive electrode active material layer 309 from being collapsed, even when the volume of the positive electrode active materials 321 is increased/decreased due to charge/discharge. That is to say, the graphene 323 included in the positive electrode in the power storage device of one embodiment of the present invention has a function of maintaining the bond between the positive electrode active materials 321 even when the volume of the positive electrode active materials 321 is increased/decreased due to charge/discharge. Thus, the use of the positive electrode 311 allows an improvement in durability of the power storage device.

That is to say, binder does not have to be used in forming the positive electrode active material layer 309. Therefore, the proportion of the positive electrode active materials in the positive electrode active material layer with certain weight can be increased, leading to an increase in charge and discharge capacity per unit weight of the electrode.

The graphene 323 has conductivity and is in contact with a plurality of particles of the positive electrode active materials 321; thus, it also serves as a conductive additive. For this reason, binder does not have to be used in forming the positive electrode active material layer 309. Accordingly, the proportion of the positive electrode active materials in the positive electrode active material layer with certain weight can be increased, leading to an increase in charge and discharge capacity of a power storage device per unit weight of the electrode.

Further, the graphene 323 is graphene of one embodiment of the present invention. That is, the graphene 323 is obtained by electrochemical reduction with electric energy and has higher conductivity than graphene obtained by reduction through heat treatment, as described in Embodiment 1. A sufficient conductive path (conductive path of carrier ions) is formed efficiently in the positive electrode active material layer 309, so that the positive electrode active material layer 309 and the positive electrode 311 have high conductivity. Accordingly, the capacity of the positive electrode active material 321 in the power storage device including the positive electrode 311, which is almost equivalent to the theoretical capacity, can be utilized efficiently; thus, the discharge capacity can be sufficiently high.

Next, a formation method of the positive electrode 311 will be described.

Slurry containing the particulate positive electrode active materials 321 and graphene oxide is formed. Specifically, the particulate positive electrode active materials 321 and a dispersion liquid containing graphene oxide are mixed to form the slurry. Note that the dispersion liquid containing graphene oxide can be formed by the method described in Embodiment 1.

After the positive electrode current collector 307 is coated with the slurry, drying is performed for a certain period of time to remove a solvent from the slurry coating the positive electrode current collector 307. For the details, refer to Embodiment 1 as appropriate. Note that in this case, molding may be performed by applying pressure as needed.

Then, the graphene oxide is electrochemically reduced with electric energy to the graphene 323 as in the formation method of graphene in Embodiment 1. Through the above process, the positive electrode active material layer 309 can be formed over the positive electrode current collector 307, whereby the positive electrode 311 can be formed.

When the positive electrode 311 is formed, the graphene oxide is negatively charged in a polar solvent because the graphene oxide contains oxygen. As a result of being negatively charged, the graphene oxide is dispersed. Accordingly, the positive electrode active materials 321 contained in the slurry are not easily aggregated, so that the size of the particle of the positive electrode active material 321 can be prevented from increasing in the formation process of the positive electrode 311. Thus, it is possible to prevent an increase in internal resistance and the transfer of electrons (and carrier ions) in the positive electrode active material 321 is easy, leading to high conductivity of the positive electrode active material layer 309 and the positive electrode 311.

Note that when the positive electrode 311 is formed, the step of reducing the graphene oxide to form the graphene 323 may be performed after fabrication of a power storage device including a negative electrode, an electrolyte, and a separator. In other words, a potential at which reduction reaction of the graphene oxide occurs may be supplied to the positive electrode current collector 307 after fabrication of the power storage device.

Next, a negative electrode and a formation method thereof will be described.

Figure 5A:
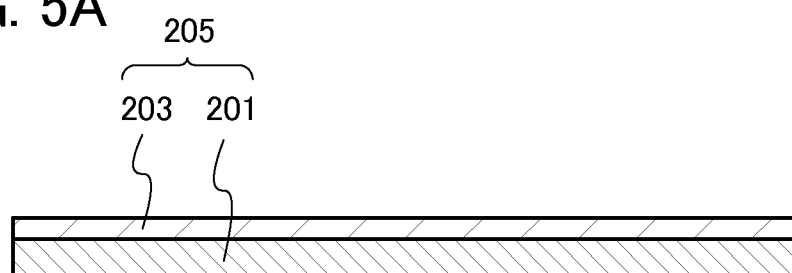
FIGS. 5A to 5D illustrate a negative electrode of one embodiment of the present invention.

FIG. 5A is a cross-sectional view of a negative electrode 205. In the negative electrode 205, a negative electrode active material layer 203 is formed over a negative electrode current collector 201. The negative electrode active material layer 203 includes at least a negative electrode active material 211 and graphene 213 and may further include binder and/or a conductive additive.

As the negative electrode current collector 201, a material having high conductivity such as copper, stainless steel, iron, or nickel can be used. The negative electrode current collector 201 can have a foil shape, a plate shape, a mesh shape, or the like as appropriate.

The negative electrode active material layer 203 is formed using the negative electrode active material 211 capable of occluding and releasing carrier ions. As typical examples of the negative electrode active material 211, lithium, aluminum, graphite, silicon, tin, and germanium are given. Further, a compound containing one or more of lithium, aluminum, graphite, silicon, tin, and germanium is given. Note that it is possible to omit the negative electrode current collector 201 and use the negative electrode active material layer 203 alone for the negative electrode. The theoretical capacity of germanium, silicon, lithium, and aluminum as the negative electrode active material 211 is higher than that of graphite as the negative electrode active material 211. When the theoretical capacity is high, the amount of negative electrode active material can be reduced, so that reductions in cost and size of a power storage device can be achieved.

Figure 5B:
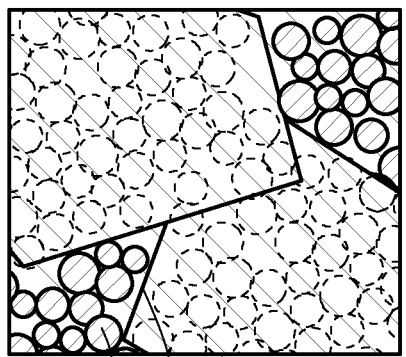

FIG. 5B is a plan view of part of the negative electrode active material layer 203. The negative electrode active material layer 203 includes negative electrode active materials 211, which are particles, and the graphenes 213 which cover a plurality of particles of the negative electrode active materials 211 and at least partly surround the plurality of particles of the negative electrode active materials 211. The different graphenes 213 cover surfaces of the plurality of particles of the negative electrode active materials 211. The negative electrode active materials 211 may partly be exposed.

Figure 5C:
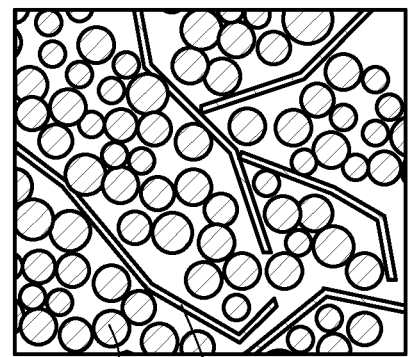

FIG. 5C is a cross-sectional view of part of the negative electrode active material layer 203 in FIG. 5B. FIG. 5C illustrates the negative electrode active materials 211 and the graphenes 213. The graphenes 213 cover a plurality of the negative electrode active materials 211 in the negative electrode active material layer 203 in the plan view. The graphenes 213 are observed to have linear shapes in cross section. One graphene or plural graphenes overlap with the plurality of particles of the negative electrode active materials 211, or the plurality of particles of the negative electrode active materials 211 are at least partly surrounded with one graphene or plural graphenes. Note that the graphene 213 has a bag-like shape, and the plurality particles of the negative electrode active materials are at least partly surrounded with the bag-like portion in some cases. The graphene 213 partly has openings where the negative electrode active materials 211 are exposed in some cases.

The desired thickness of the negative electrode active material layer 203 is determined in the range of 20 μm to 100 μm.

The negative electrode active material layer 203 may contain a known conductive additive such as acetylene black particles having a volume 0.1 to 10 times as large as that of the graphene, or carbon particles having a one-dimensional expansion (e.g., carbon nanofibers), and/or a known binder such as polyvinylidene difluoride.

The negative electrode active material layer 203 may be predoped with lithium in such a manner that a lithium layer is formed on a surface of the negative electrode active material layer 203 by a sputtering method. Alternatively, lithium foil is provided on the surface of the negative electrode active material layer 203, whereby the negative electrode active material layer 203 can be predoped with lithium. Particularly in the case of forming the graphene 323 on the positive electrode active material layer 309 in the positive electrode 311 after fabrication of a power storage device, the negative electrode active material layer 203 is preferably predoped with lithium.

As an example of the negative electrode active material 211, a material whose volume is expanded by occlusion of carrier ions is given. When such a material is used, the negative electrode active material layer gets vulnerable and is partly collapsed by charge and discharge, resulting in lower reliability (e.g., inferior cycle characteristics) of a power storage device. However, the graphene 213 covering the periphery of the negative electrode active materials 211 in the negative electrode in the power storage device of one embodiment of the present invention can prevent the negative electrode active materials 211 from being pulverized and can prevent the negative electrode active material layer 203 from being collapsed, even when the volume of the negative electrode active materials 211 is increased/decreased due to charge/discharge. That is to say, the graphene 213 included in the negative electrode in the power storage device of one embodiment of the present invention has a function of maintaining the bond between the negative electrode active materials 211 even when the volume of the negative electrode active materials 211 is increased/decreased due to charge/discharge. Thus, the use of the negative electrode 205 allows an improvement in durability of the power storage device.

That is to say, binder does not have to be used in forming the negative electrode active material layer 203. Therefore, the proportion of the negative electrode active materials in the negative electrode active material layer with certain weight can be increased, leading to an increase in discharge capacity per unit weight of the electrode.

The graphene 213 has conductivity and is in contact with a plurality of particles of the negative electrode active materials 211; thus, it also serves as a conductive additive. Thus, binder does not have to be used in forming the negative electrode active material layer 203. Accordingly, the proportion of the negative electrode active materials in the negative electrode active material layer with certain weight (certain volume) can be increased, leading to an increase in charge and discharge capacity per unit weight (unit volume) of the electrode.

Further, the graphene 213 is graphene of one embodiment of the present invention. That is, the graphene 213 is obtained by electrochemical reduction with electric energy and has higher conductivity than graphene obtained by reduction through heat treatment, as described in Embodiment 1. A sufficient conductive path (conductive path of carrier ions) is formed efficiently in the negative electrode active material layer 203, so that the negative electrode active material layer 203 and the negative electrode 205 have high conductivity. Accordingly, the capacity of the negative electrode active material 211 in a power storage device including the negative electrode 205, which is almost equivalent to the theoretical capacity, can be utilized as efficiently; thus, the discharge capacity can be sufficiently high.

Note that the graphene 213 also functions as a negative electrode active material capable of occluding and releasing carrier ions, leading to an increase in charge capacity of the negative electrode 205.

Next, a formation method of the negative electrode active material layer 203 in FIGS. 5B and 5C will be described.

Slurry containing the particulate negative electrode active materials 211 and graphene oxide is formed. Specifically, the particulate negative electrode active materials 211 and a dispersion liquid containing graphene oxide are mixed to form the slurry. The dispersion liquid containing graphene oxide can be formed by the method described in Embodiment 1.

After the negative electrode current collector 201 is coated with the slurry, drying is performed in vacuum for a certain period of time to remove a solvent from the slurry coating the negative electrode current collector 201. For the details, refer to Embodiment 1 as appropriate. Note that in this case, molding may be performed by applying pressure as needed.

Then, the graphene oxide is electrochemically reduced with electric energy to the graphene 213 as in the formation method of graphene in Embodiment 1. Through the above process, the negative electrode active material layer 203 can be formed over the negative electrode current collector 201, whereby the negative electrode 205 can be formed.

In the case where graphene in the positive electrode 311 and the negative electrode 205 is formed by the method described in Embodiment 1 in fabricating a power storage device including the positive electrode 311 and the negative electrode 205, it is preferable to form graphene in either the positive electrode 311 or the negative electrode 205 in advance before fabrication of the power storage device. This is because when the power storage device is fabricated with graphene oxide provided in the positive electrode 311 and the negative electrode 205, potential cannot be efficiently supplied to the positive electrode 311 and the negative electrode 205, so that the graphene oxide is reduced insufficiently or it takes a long time to sufficiently reduce the graphene oxide.

When the negative electrode 205 is formed, the graphene oxide is negatively charged in a polar solvent because it contains oxygen. As a result of being negatively charged, the graphene oxide is dispersed. Accordingly, the negative electrode active materials 211 contained in the slurry are not easily aggregated, so that the size of the particle of the negative electrode active material 211 can be prevented from increasing in the formation process of the negative electrode 205. Thus, it is possible to prevent an increase in internal resistance and the transfer of electrons (and carrier ions) in the negative electrode active material 211 is easy, leading to high conductivity of the negative electrode active material layer 203 and the negative electrode 205.

Next, the structure of a negative electrode in FIG. 5D will be described.

Figure 5D:
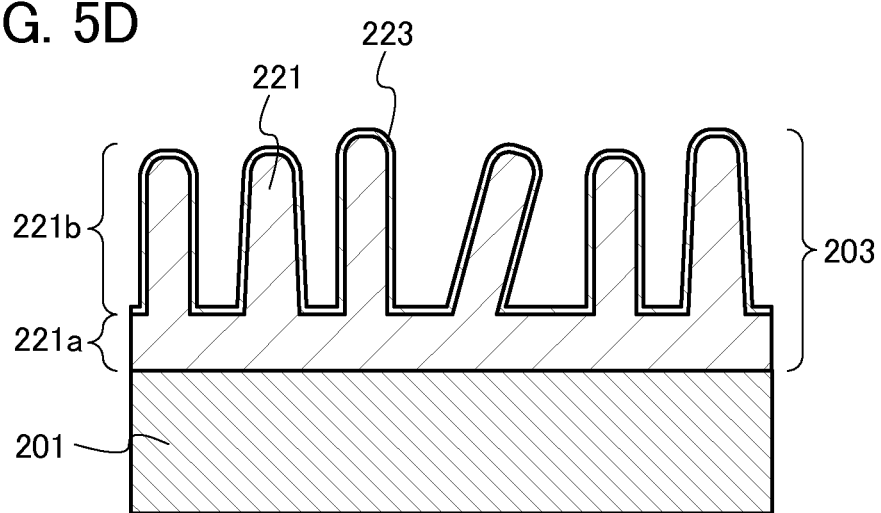

FIG. 5D is a cross-sectional view of the negative electrode where the negative electrode active material layer 203 is formed over the negative electrode current collector 201. The negative electrode active material layer 203 includes a negative electrode active material 221 having an uneven surface and graphene 223 covering a surface of the negative electrode active material 221.

The uneven negative electrode active material 221 includes a common portion 221a and a projected portion 221b extending from the common portion 221a. The projected portion 221b can have a columnar shape such as a cylinder shape or a prism shape, or a needle shape such as a cone shape or a pyramid shape as appropriate. The top portion of the projected portion may be curved. The negative electrode active material 221 is formed using a negative electrode active material capable of occluding and releasing carrier ions (typically, lithium ions) similarly to the negative electrode active material 211. Note that the common portion 221a and the projected portion 221b may be formed using either the same material or different materials.

In the case of silicon which is an example of a negative electrode active material, the volume is approximately quadrupled due to occlusion of ions serving as carriers; therefore, the negative electrode active material gets vulnerable and is partly collapsed by charge and discharge, resulting in lower reliability (e.g., inferior cycle characteristics) of a power storage device. However, when silicon is used as the negative electrode active material 221 in the negative electrode illustrated in FIG. 5D, the graphene 223 covering the periphery of the negative electrode active material 221 can prevent the negative electrode active material 221 from being pulverized and can prevent the negative electrode active material layer 203 from being collapsed, even when the volume of the negative electrode active material 221 is increased/decreased due to charge/discharge.

When a surface of a negative electrode active material layer is in contact with an electrolyte contained in a power storage device, the electrolyte and the negative electrode active material react with each other, so that a film is formed on a surface of a negative electrode. The film is called a solid electrolyte interface (SEI) and considered necessary to relieve the reaction of the negative electrode and the electrolyte for stabilization. However, when the thickness of the film is increased, carrier ions are less likely to be occluded in the negative electrode, leading to problems such as a reduction in conductivity of carrier ions between the electrode and the electrolyte and a waste of the electrolyte.

The graphene 213 coating the surface of the negative electrode active material layer 203 can prevent an increase in thickness of the film, so that a decrease in charge and discharge capacity can be prevented.

Next, a formation method of the negative electrode active material layer 203 in FIG. 5D will be described.

The uneven negative electrode active material 221 is provided over the negative electrode current collector 201 by a printing method, an ink-jet method, a CVD method, or the like. Alternatively, a negative electrode active material having a film shape is formed by a coating method, a sputtering method, an evaporation method, or the like, and then is selectively removed, so that the uneven negative electrode active material 221 is provided over the negative electrode current collector 201. Still alternatively, a surface of foil or a plate which is formed of lithium, aluminum, graphite, or silicon is partly removed to form the negative electrode current collector 201 and the negative electrode active material 221 that have an uneven shape. Further alternatively, a net formed of lithium, aluminum, graphite, or silicon may be used for the negative electrode active material and the negative electrode current collector.

Then, the uneven negative electrode active material 221 is coated with a dispersion liquid containing graphene oxide. As a method for applying the dispersion liquid containing graphene oxide, the method described in Embodiment 1 may be employed as appropriate.

Subsequently, a solvent in the dispersion liquid containing graphene oxide is removed as described in Embodiment 1. After that, electric energy may be used to electrochemically reduce the graphene oxide to form the graphene 213, as described in Embodiment 1.

When the graphene is thus formed with the use of the dispersion liquid containing graphene oxide, the surface of the uneven negative electrode active material 221 can be coated with the graphene 213 with an even thickness.

In the case where graphene in the positive electrode 311 and the negative electrode illustrated in FIG. 5D is formed by the method described in Embodiment 1 in fabricating a power storage device including the positive electrode 311 and the negative electrode, it is preferable to form the graphene in either the positive electrode 311 or the negative electrode in advance before fabrication of the power storage device. This is because when the power storage device is fabricated with graphene oxide provided in the positive electrode 311 and the negative electrode, potential cannot be efficiently supplied to the positive electrode 311 and the negative electrode, so that the graphene oxide is reduced insufficiently or it takes a long time to sufficiently reduce the graphene oxide.

Note that the uneven negative electrode active material 221 (hereinafter referred to as silicon whiskers) formed of silicon can be provided over the negative electrode current collector 201 by an LPCVD method using silane, silane chloride, silane fluoride, or the like as a source gas.

The silicon whiskers may be amorphous. When amorphous silicon whiskers are used for the negative electrode active material layer 203, the volume is less likely to be changed due to occlusion and release of carrier ions (e.g., stress caused by expansion in volume is relieved). For this reason, the silicon whiskers and the negative electrode active material layer 203 can be prevented from being pulverized and collapsed, respectively, due to repeated cycles of charge and discharge; accordingly, a power storage device can have further improved cycle characteristics.

Alternatively, the silicon whisker may be crystalline. In this case, the crystalline structure having excellent conductivity and carrier ion mobility is in contact with the current collector in a wide range of area. Therefore, it is possible to further improve the conductivity of the entire negative electrode, which enables charge and discharge to be performed at much higher speed; accordingly, a power storage device whose charge and discharge capacity is improved can be fabricated.

Still alternatively, the silicon whisker may include a core, which is a crystalline region, and an outer shell covering the core, which is an amorphous region.

The amorphous outer shell has a characteristic that the volume is less likely to be changed due to occlusion and release of carrier ions (e.g., stress caused by expansion in volume is relieved). In addition, the crystalline core, which has excellent conductivity and ion mobility, has a characteristic that the rate of occluding ions and the rate of releasing ions are high per unit mass. Thus, when the silicon whisker having the core and the outer shell is used for the negative electrode active material layer, charging and discharging can be performed at high speed; accordingly, a power storage device whose charge and discharge capacity and cycle characteristics are improved can be fabricated.

Figure 6:
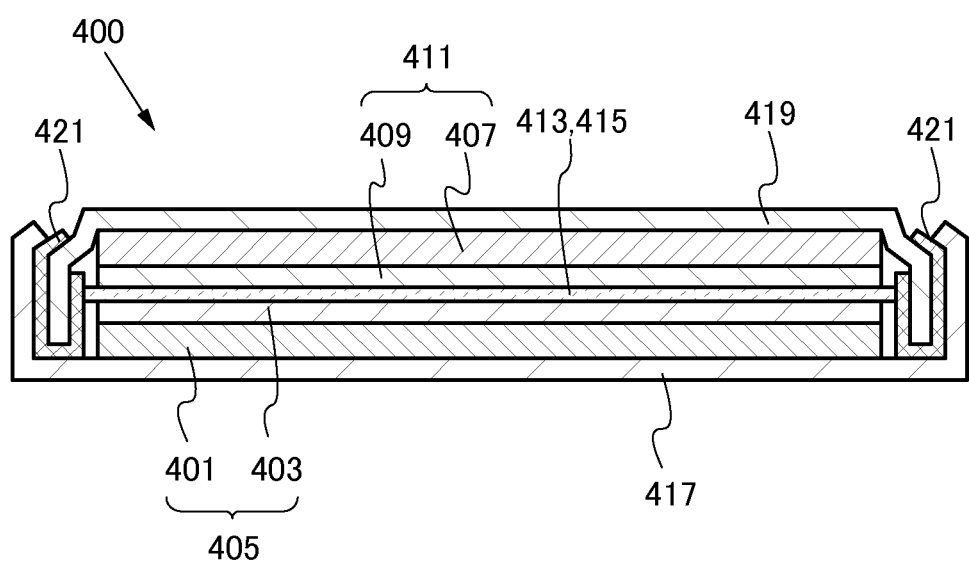
FIG. 6 illustrates a power storage device of one embodiment of the present invention.

Next, how to fabricate a power storage device of one embodiment of the present invention will be described. FIG. 6 is a cross-sectional view of a lithium secondary battery 400, and the cross-sectional structure thereof will be described below.

A lithium secondary battery 400 includes a negative electrode 411 including a negative electrode current collector 407 and a negative electrode active material layer 409, a positive electrode 405 including a positive electrode current collector 401 and a positive electrode active material layer 403, and a separator 413 provided between the negative electrode 411 and the positive electrode 405. Note that the separator 413 is impregnated with an electrolyte 415. The negative electrode current collector 407 is connected to an external terminal 419 and the positive electrode current collector 401 is connected to an external terminal 417. An end portion of the external terminal 419 is embedded in a gasket 421. That is to say, the external terminals 417 and 419 are insulated from each other by the gasket 421.

As the negative electrode current collector 407 and the negative electrode active material layer 409, the negative electrode current collector 201 and the negative electrode active material layer 203, which are described above, can be used as appropriate.

As the positive electrode current collector 401 and the positive electrode active material layer 403, the positive electrode current collector 307 and the positive electrode active material layer 309, which are described above, can be used as appropriate.

As the separator 413, an insulating porous material is used. Typical examples of the separator 413 include paper; nonwoven fabric; a glass fiber; ceramics; and synthetic fiber containing nylon (polyamide), vinylon (polyvinyl alcohol based fiber), polyester, acrylic, polyolefin, or polyurethane. Note that a material which is not dissolved in the electrolyte 415 needs to be selected.

When a positive electrode provided with a spacer over the positive electrode active material layer is used as the positive electrode 405, the separator 413 does not necessarily have to be provided.

As a solute of the electrolyte 415, a material which contains carrier ions is used. Typical examples of the solute of the electrolyte include lithium salts such as $LiClO_4$, $LiAsF_6$, $LiBF_4$, $LiPF_6$, and $Li(C_2F_5SO_2)_2N$.

Note that when carrier ions are alkali metal ions other than lithium ions, alkaline-earth metal ions, beryllium ions, or magnesium ions, instead of lithium in the above lithium salts, an alkali metal (e.g., sodium or potassium), an alkaline-earth metal (e.g., calcium, strontium, or barium), beryllium, or magnesium may be used for a solute of the electrolyte 415.

As a solvent of the electrolyte 415, a material in which lithium ions can transfer is used. As the solvent of the electrolyte 415, an aprotic organic solvent is preferably used. Typical examples of aprotic organic solvents include ethylene carbonate, propylene carbonate, dimethyl carbonate, diethyl carbonate, γ-butyrolactone, acetonitrile, dimethoxyethane, tetrahydrofuran, and the like, and one or more of these materials can be used. When a gelled high-molecular material is used as the solvent of the electrolyte 415, safety against liquid leakage and the like is improved. Further, the lithium secondary battery 400 can be thinner and more lightweight. Typical examples of gelled high-molecular materials include a silicon gel, an acrylic gel, an acrylonitrile gel, polyethylene oxide, polypropylene oxide, a fluorine-based polymer, and the like. Alternatively, the use of one or more of ionic liquids (room temperature molten salts) which are less likely to burn and volatilize as a solvent of the electrolyte 415 can prevent a power storage device from exploding or catching fire even when the power storage device internally shorts out or the internal temperature increases due to overcharging or the like.

As the electrolyte 415, a solid electrolyte such as $Li_3PO_4$ can be used. Other examples of the solid electrolyte include $Li_xPO_yN_z$ (x, y, and z are positive real numbers) which is formed by mixing $Li_3PO_4$ with nitrogen; $Li_2S$—$SiS_2$; $Li_2S$—$P_2S_5$; and $Li_2S$—$B_2S_3$. Any of the above solid electrolytes which is doped with LiI or the like may be used. Note that in the case of using such a solid electrolyte as the electrolyte 415, the separator 413 is unnecessary.

For the external terminals 417 and 419, a metal material such as a stainless steel plate or an aluminum plate can be used as appropriate.

Note that in this embodiment, a coin-type lithium-ion secondary battery is given as the lithium secondary battery 400; however, any of lithium secondary batteries with various shapes, such as a sealing-type lithium secondary battery, a cylindrical lithium secondary battery, and a square-type lithium secondary battery, can be used. Further, a structure in which a plurality of positive electrodes, a plurality of negative electrodes, and a plurality of separators are stacked or rolled may be employed.

A lithium secondary battery has a small memory effect, a high energy density, a large capacity, and a high output voltage, which enables reduction in size and weight. Further, the lithium-ion secondary battery does not easily deteriorate due to repeated charge and discharge and can be used for a long time, so that cost can be reduced.

The formation methods of a positive electrode and a negative electrode, which are described in Embodiment 1 and this embodiment, are employed as appropriate to form the positive electrode 405 and the negative electrode 411.

Next, the positive electrode 405, the separator 413, and the negative electrode 411, are impregnated with the electrolyte 415. Then, the positive electrode 405, the separator 413, the gasket 421, the negative electrode 411, and the external terminal 419 are stacked in this order over the external terminal 417, and the external terminal 417 and the external terminal 419 are crimped to each other with a "coin cell crimper". Thus, the coin-type lithium secondary battery can be manufactured.

Note that a spacer and a washer may be provided between the external terminal 417 and the positive electrode 405 or between the external terminal 419 and the negative electrode 411 so that the connection between the external terminal 417 and the positive electrode 405 or between the external terminal 419 and the negative electrode 411 is enhanced.

This embodiment can be implemented in appropriate combination with any of the other embodiments.

Embodiment 3

The power storage device of one embodiment of the present invention can be used for power supplies of a variety of electric appliances which can be operated with electric power.

Specific examples of electric appliances each utilizing the power storage device of one embodiment of the present invention are as follows: display devices, lighting devices, desktop personal computers and laptop personal computers, image reproduction devices which reproduce still images and moving images stored in recording media such as digital versatile discs (DVDs), mobile phones, portable game machines, portable information terminals, e-book readers, video cameras, digital still cameras, high-frequency heating appliances such as microwave ovens, electric rice cookers, electric washing machines, air-conditioning systems such as air conditioners, electric refrigerators, electric freezers, electric refrigerator-freezers, freezers for preserving DNA, and dialyzers. In addition, moving objects driven by electric motors using electric power from power storage devices are also included in the category of electric appliances. Examples of the moving objects include electric vehicles, hybrid vehicles each including both an internal-combustion engine and an electric motor, and motorized bicycles including motor-assisted bicycles.

In the electric appliances, the power storage device of one embodiment of the present invention can be used as a power storage device for supplying enough electric power for almost the whole electric power consumption (referred to as a main power supply). Alternatively, in the electric appliances, the power storage device of one embodiment of the present invention can be used as a power storage device which can supply electric power to the electric appliances when the supply of electric power from the main power supply or a commercial power supply is stopped (such a power storage device is referred to as an uninterruptible power supply). Still alternatively, in the electric appliances, the power storage device of one embodiment of the present invention can be used as a power storage device for supplying electric power to the electric appliances at the same time as the power supply from the main power supply or a commercial power supply (such a power storage device is referred to as an auxiliary power supply).

Figure 7:
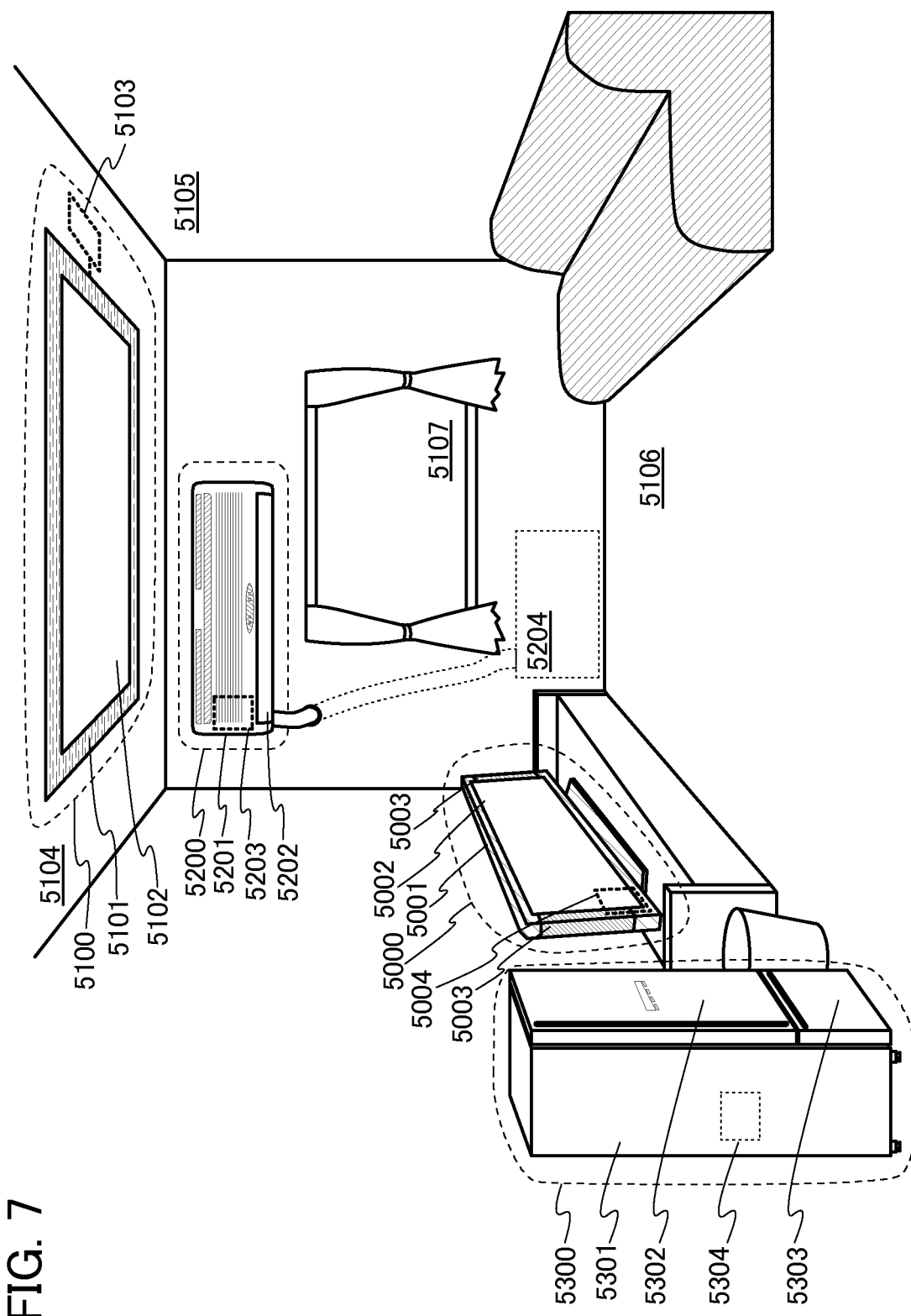
FIG. 7 illustrates electric appliances.

FIG. 7 illustrates specific structures of the electric appliances. In FIG. 7, a display device 5000 is an example of an electric appliance including a power storage device 5004. Specifically, the display device 5000 corresponds to a display device for TV broadcast reception and includes a housing 5001, a display portion 5002, speaker portions 5003, and the power storage device 5004. The power storage device 5004 is provided in the housing 5001. The power storage device of one embodiment of the present invention is used as the power storage device 5004. The display device 5000 can receive electric power from a commercial power supply. Alternatively, the display device 5000 can use electric power stored in the power storage device 5004. Thus, the display device 5000 can be operated with the use of the power storage device 5004 as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 5002.

Note that the display device includes, in its category, all of information display devices for personal computers, advertisement displays, and the like besides TV broadcast reception.

In FIG. 7, an installation lighting device 5100 is an example of an electric appliance including a power storage device 5103. Specifically, the lighting device 5100 includes a housing 5101, a light source 5102, and the power storage device 5103. The power storage device of one embodiment of the present invention is used as the power storage device 5103. Although FIG. 7 illustrates the case where the power storage device 5103 is provided in a ceiling 5104 on which the housing 5101 and the light source 5102 are installed, the power storage device 5103 may be provided in the housing 5101. The lighting device 5100 can receive electric power from a commercial power supply. Alternatively, the lighting device 5100 can use electric power stored in the power storage device 5103. Thus, the lighting device 5100 can be operated with the use of the power storage device 5103 as an uninterruptible power supply even when electric power cannot be supplied from a commercial power supply due to power failure or the like.

Note that although the installation lighting device 5100 provided in the ceiling 5104 is illustrated in FIG. 7 as an example, the power storage device of one embodiment of the present invention can be used in an installation lighting device provided in, for example, a wall 5105, a floor 5106, a window 5107, or the like other than the ceiling 5104. Alternatively, the power storage device can be used in a tabletop lighting device or the like.

As the light source 5102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 7, an air conditioner including an indoor unit 5200 and an outdoor unit 5204 is an example of an electric appliance including a power storage device 5203. Specifically, the indoor unit 5200 includes a housing 5201, an air outlet 5202, and the power storage device 5203. The power storage device of one embodiment of the present invention is used as the power storage device 5203. Although FIG. 7 illustrates the case where the power storage device 5203 is provided in the indoor unit 5200, the power storage device 5203 may be provided in the outdoor unit 5204. Alternatively, the power storage devices 5203 may be provided in both the indoor unit 5200 and the outdoor unit 5204. The air conditioner can receive electric power from a commercial power supply. Alternatively, the air conditioner can use electric power stored in the power storage device 5203. Particularly in the case where the power storage devices 5203 are provided in both the indoor unit 5200 and the outdoor unit 5204, the air conditioner can be operated with the use of the power storage device 5203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 7 as an example, the power storage device of one embodiment of the present invention can be used in an air conditioner in which the functions of an indoor unit and an outdoor unit are integrated in one housing.

In FIG. 7, an electric refrigerator-freezer 5300 is an example of an electric appliance including a power storage device 5304 of one embodiment of the present invention. Specifically, the electric refrigerator-freezer 5300 includes a housing 5301, a door for a refrigerator 5302, a door for a freezer 5303, and the power storage device 5304. The power storage device of one embodiment of the present invention is used as the power storage device 5304. The power storage device 5304 is provided in the housing 5301 in FIG. 7. The electric refrigerator-freezer 5300 can receive electric power from a commercial power supply. Alternatively, the electric refrigerator-freezer 5300 can use electric power stored in the power storage device 5304. Thus, the electric refrigerator-freezer 5300 can be operated with the use of the power storage device 5304 as an uninterruptible power supply even when electric power cannot be supplied from a commercial power supply due to power failure or the like.

Note that among the electric appliances described above, a high-frequency heating apparatus such as a microwave oven and an electric appliance such as an electric rice cooker require high power in a short time. The tripping of a breaker of a commercial power supply in use of an electric appliance can be prevented by using the power storage device of one embodiment of the present invention as an auxiliary power supply for supplying electric power which cannot be supplied enough by a commercial power supply.

In addition, in a time period when electric appliances are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electric appliances are used. For example, in the case of the electric refrigerator-freezer 5300, electric power can be stored in the power storage device 5304 in night time when the temperature is low and the door for a refrigerator 5302 and the door for a freezer 5303 are not often opened or closed. On the other hand, in daytime when the temperature is high and the door for a refrigerator 5302 and the door for a freezer 5303 are frequently opened and closed, the power storage device 5304 is used as an auxiliary power supply; thus, the usage rate of electric power in daytime can be reduced.

Next, a personal digital assistant including a power storage device of one embodiment of the present invention will be described with reference to FIGS. 8A to 8C.

Figure 8A:
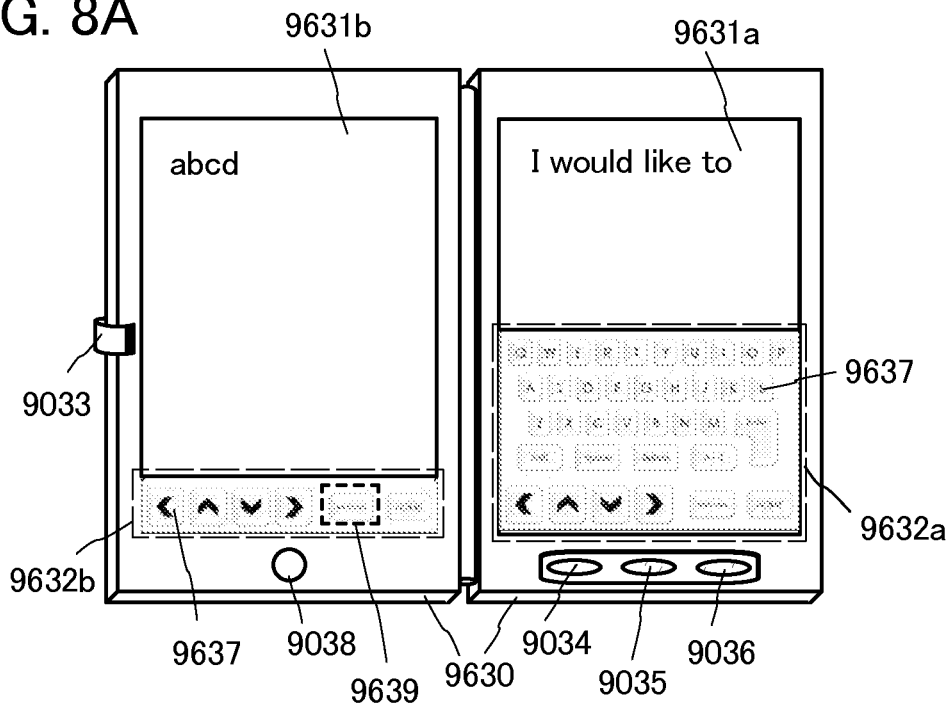
FIGS. 8A to 8C illustrate an electric appliance.
Figure 8B:
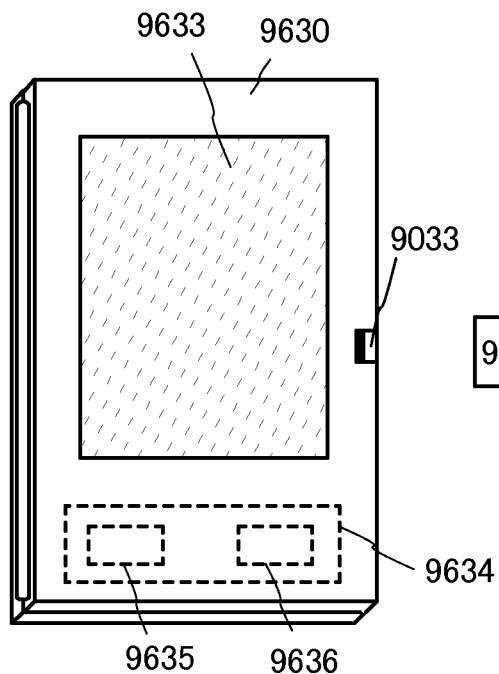

FIGS. 8A and 8B illustrate a tablet terminal that can be folded. FIG. 8A illustrates the tablet terminal in the state of being unfolded. The tablet terminal includes a housing 9630, a display portion 9631*a*, a display portion 9631*b*, a display-mode switching button 9034, a power button 9035, a power-saving-mode switching button 9036, a fastener 9033, and an operation button 9038.

A touch panel area 9632*a* can be provided in part of the display portion 9631*a*, in which area, data can be input by touching displayed operation keys 9637. Note that half of the display portion 9631a has only a display function and the other half has a touch panel function. However, the structure of the display portion 9631a is not limited to this, and all the area of the display portion 9631a may have a touch panel function. For example, a keyboard can be displayed on the whole display portion 9631a to be used as a touch panel, and the display portion 9631b can be used as a display screen.

A touch panel area 9632b can be provided in part of the display portion 9631b like in the display portion 9631a. When a keyboard display switching button 9639 displayed on the touch panel is touched with a finger, a stylus, or the like, a keyboard can be displayed on the display portion 9631b.

The touch panel area 9632a and the touch panel area 9632b can be controlled by touch input at the same time.

The display-mode switching button 9034 allows switching between a landscape mode and a portrait mode, color display and black-and-white display, and the like. The power-saving-mode switching button 9036 allows optimizing the display luminance in accordance with the amount of external light in use which is detected by an optical sensor incorporated in the tablet terminal. In addition to the optical sensor, other detecting devices such as sensors for determining inclination, such as a gyroscope or an acceleration sensor, may be incorporated in the tablet terminal.

Although the display area of the display portion 9631a is the same as that of the display portion 9631b in FIG. 8A, one embodiment of the present invention is not particularly limited thereto. The display area of the display portion 9631a may be different from that of the display portion 9631b, and further, the display quality of the display portion 9631a may be different from that of the display portion 9631b. For example, one of the display portions 9631a and 9631b may display higher definition images than the other.

FIG. 8B illustrates the tablet terminal in the state of being closed. The tablet terminal includes the housing 9630, a solar cell 9633, a charge/discharge control circuit 9634, a battery 9635, and a DC-DC converter 9636. FIG. 8B illustrates an example where the charge/discharge control circuit 9634 includes the battery 9635 and the DC-DC converter 9636. A power storage device of one embodiment of the present invention is used as the battery 9635.

Since the tablet terminal can be folded, the housing 9630 can be closed when the tablet terminal is not in use. Thus, the display portions 9631a and 9631b can be protected, which permits the tablet terminal to have high durability and improved reliability for long-term use.

The tablet terminal illustrated in FIGS. 8A and 8B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on a surface of the tablet terminal, can supply electric power to a touch panel, a display portion, an image signal processor, and the like. Note that a structure in which the solar cell 9633 is provided on one or two surfaces of the housing 9630 is preferable to charge the battery 9635 efficiently. The use of a power storage device of one embodiment of the present invention as the battery 9635 has advantages such as a reduction in size.

The structure and operation of the charge/discharge control circuit 9634 illustrated in FIG. 8B will be described with reference to a block diagram of FIG. 8C. FIG. 8C illustrates the solar cell 9633, the battery 9635, the DC-DC converter 9636, a converter 9638, switches SW1 to SW3, and the display portion 9631. The battery 9635, the DC-DC converter 9636, the converter 9638, and the switches SW1 to SW3 correspond to the charge and discharge control circuit 9634 in FIG. 8B.

First, an example of operation in the case where electric power is generated by the solar cell 9633 using external light will be described. The voltage of electric power generated by the solar cell is raised or lowered by the DC-DC converter 9636 so that the electric power has a voltage for charging the battery 9635. When the display portion 9631 is operated with the electric power from the solar cell 9633, the switch SW1 is turned on and the voltage of the electric power is raised or lowered by the converter 9638 to a voltage needed for operating the display portion 9631. In addition, when display on the display portion 9631 is not performed, the switch SW1 is turned off and the switch SW2 is turned on so that the battery 9635 may be charged.

Although the solar cell 9633 is described as an example of a power generation means, there is no particular limitation on the power generation means, and the battery 9635 may be charged with any of the other means such as a piezoelectric element or a thermoelectric conversion element (Peltier element). For example, the battery 9635 may be charged with a non-contact power transmission module capable of performing charging by transmitting and receiving electric power wirelessly (without contact), or any of the other charge means used in combination.

Figure 8C:
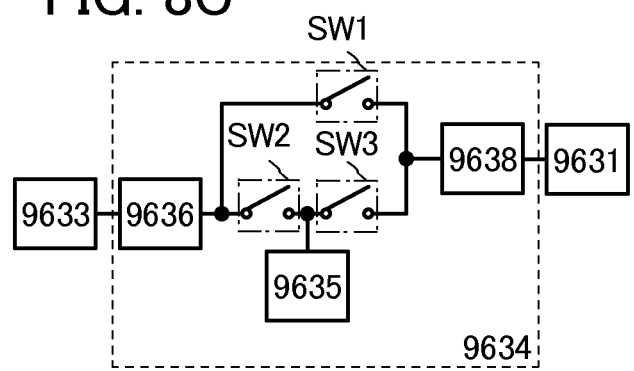

It is needless to say that an embodiment of the present invention is not limited to the electric equipment illustrated in FIGS. 8A to 8C as long as the electric equipment is equipped with the power storage device described in the above embodiment.

This embodiment can be implemented in appropriate combination with any of the other embodiments.

Example 1

In this example, a lithium secondary battery (referred to as a lithium secondary battery 1) was fabricated according to one embodiment of the present invention and measured by cyclic voltammetry (CV).

First, the structure and the fabrication method of the lithium secondary battery 1 will be described.

The lithium secondary battery 1 was a coin lithium secondary battery. As a working electrode of the lithium secondary battery, an electrode in which an active material layer including $LiFePO_4$ and graphene oxide was provided over a current collector made of aluminum was used. As a counter electrode and a reference electrode, lithium metals were used. As a separator, a polypropylene sheet was used. As an electrolyte, a mixed solution in which 1M of $LiPF_6$ (ethylene carbonate solvent) and diethyl carbonate were mixed at a ratio (volume ratio) of 1:1 was used.

Here, a method for forming the working electrode will be described.

<Synthesis Method of $LifePO_4$>

Lithium carbonate ($Li_2CO_3$), iron oxalate ($Fe_2CO_4 \cdot 2H_2O$), and ammonium dihydrogen phosphate ($NH_4H_2PO_4$), which were materials, were weighed so that the molar ratio of $Li_2CO_3$:$Fe_2CO_4 \cdot 2H_2O$:$NH_4H_2PO_4$ was 1:2:2. Then, the materials were ground and mixed with a wet ball mill (the ball diameter was 3 mm and acetone was used as a solvent) at 300 rpm for two hours.

Next, the ground and mixed materials were subjected to pre-baking at 350° C. in a nitrogen atmosphere for ten hours and then ground and mixed with a wet ball mill (the ball diameter was 3 mm and acetone was used as a solvent) at 300 rpm for two hours again. After that, baking was performed at 600° C. in a nitrogen atmosphere for ten hours to yield $LiFePO_4$.

<Synthesis Method of Graphene Oxide>

To form the mixed solution A, 2 g of graphite and 92 ml of concentrated sulfuric acid were mixed. Then, 12 g of potassium permanganate was added to the mixed solution A while they were stirred in an ice bath, so that the mixed solution B was formed. After the ice bath was removed and stirring was performed at room temperature for two hours, the resulting solution was left at 35° C. for 30 minutes so that the graphite was oxidized. Consequently, the mixed solution C containing graphite oxide was formed.

Next, 184 ml of water was added to the mixed solution C while they were stirred in an ice bath, so that a mixed solution D was formed. After the mixed solution D was stirred in an oil bath at about 98° C. for 15 minutes so that reaction was caused, 580 ml of water and 36 ml of hydrogen peroxide solution (with a concentration of 30 wt %) were added to the mixed solution D while they were stirred, in order to reduce unreacted potassium permanganate. Consequently, a mixed solution E containing soluble manganese sulfate and the graphite oxide was formed.

After the mixed solution E was subjected to suction filtration using a membrane filter with a hole diameter of 0.45 μm to give the precipitate A, the precipitate A and 3 wt % of hydrochloric acid were mixed, so that a mixed solution F in which a manganese ion, a potassium ion, and a sulfate ion were dissolved was formed. After that, the mixed solution F was subjected to suction filtration to give the precipitate B containing the graphite oxide.

After the precipitate B was mixed with 500 ml of water to form a mixed solution G, ultrasonic waves with a frequency of 40 kHz were applied to the mixed solution G for one hour to separate carbon layers in the graphite oxide from each other, so that graphene oxide was formed.

Next, centrifugation was carried out at 4000 rpm for about 30 minutes, and a supernatant fluid containing the graphene oxide was collected. The supernatant fluid is a mixed solution H.

Next, ammonia water was added to the mixed solution H so that the mixed solution has a pH of 11, whereby a mixed solution I was formed. After that, 2500 ml of acetone was added to the mixed solution I and they were mixed to form a mixed solution J. At this time, the graphene oxide contained in the mixed solution H reacted with ammonia contained in the ammonia water to form graphene oxide salt (specifically, ammonium salt of graphene oxide) as a precipitate in the mixed solution J.

The mixed solution J was filtrated, and the precipitate in the mixed solution J was dried at room temperature in vacuum to collect the graphene oxide salt.

<Formation Method of Active Material Layer>

The working electrode in which an active material layer was provided over the current collector was formed in such a manner that 97 wt % $LiFePO_4$ and 3 wt % graphene oxide salt were mixed with NMP (N-methylpyrrolidone) having a weight about twice as large as the total weight of the $LiFePO_4$ and the graphene oxide salt to form a paste, the paste was applied to the current collector made of aluminum, ventilation drying was performed at 120° C. for 15 minutes, and then the current collector was heated to 100° C. and drying was performed for one hour in vacuum.

Next, the process of fabricating the lithium secondary battery 1 will be described. At the beginning, in a first battery can, the working electrode was provided so as to be immersed in the electrolyte, the separator was provided over the working electrode so as to be immersed in the electrolyte, and a gasket was provided over the separator. Then, a lithium metal was provided over the separator and the gasket, and a spacer and a spring washer were provided over the lithium electrode. After a second battery can was provided over the spring washer, the first battery can was crimped. In this manner, the lithium secondary battery 1 was fabricated.

Figure 9:
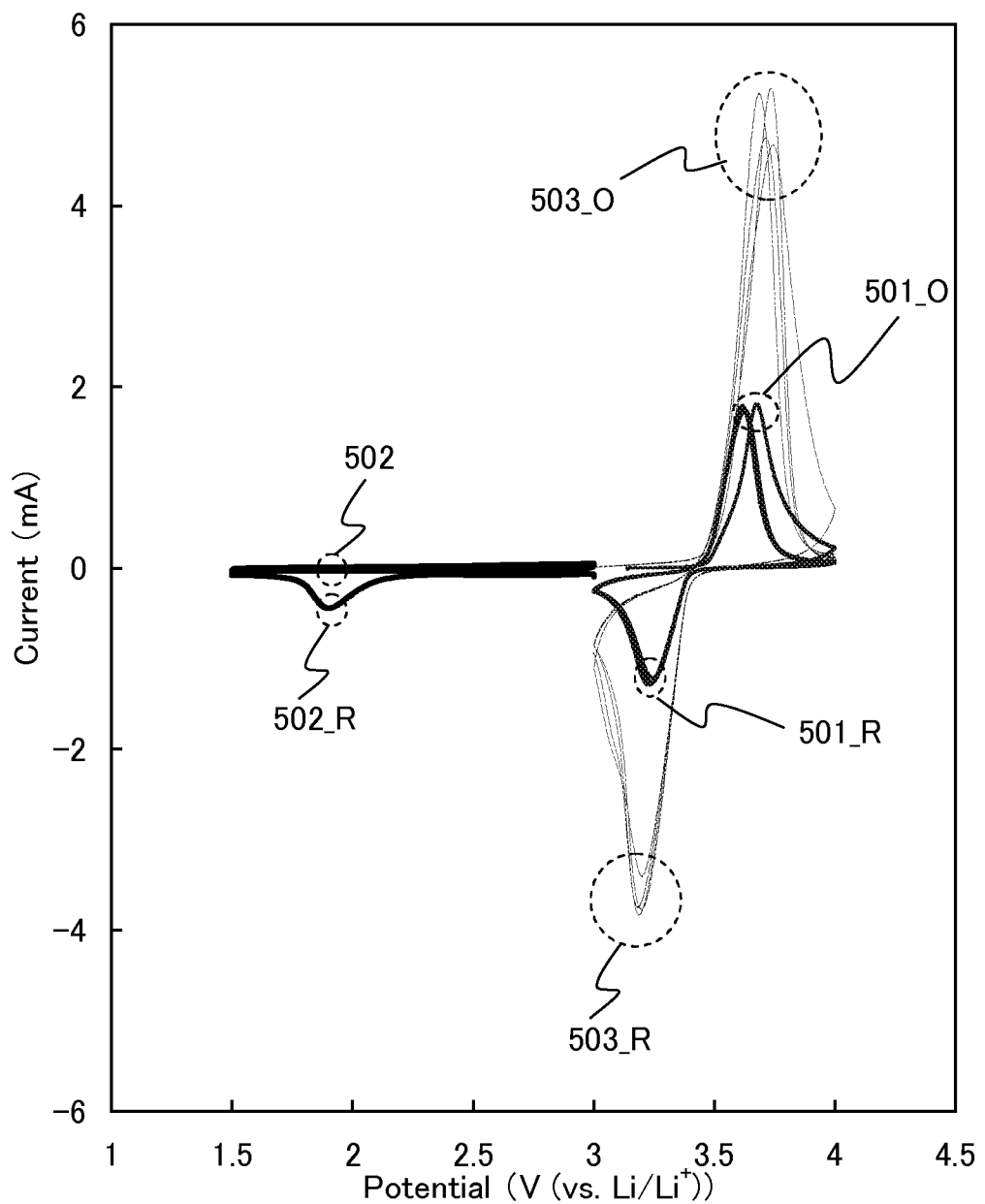
FIG. 9 shows a result of cyclic voltammetry measurement.

Next, CV measurement of the lithium secondary battery 1 was performed. The sweep rate was 1 mV/s. In the first step under the condition that the sweep potential was 3 V to 4 V, a cycle in which a supplied potential was swept from 3 V to 4 V and then swept from 4 V to 3 V was repeated four times. In the second step under the condition that the sweep potential was 1.5 V to 3 V, a cycle in which a supplied potential was swept from 3 V to 1.5 V and then swept from 1.5 V to 3 V was repeated four times. In the third step under the condition that the sweep potential was 3 V to 4 V, a cycle in which a supplied potential was swept from 3 V to 4 V and then swept from 4 V to 3 V was repeated four times. FIG. 9 shows current-potential curves in this case.

In FIG. 9, the horizontal axis represents potential of the working electrode (vs. $Li/Li^+$), and the vertical axis represents current generated by reduction-oxidation. Note that negative current values indicate reduction current, and positive current values indicate oxidation current.

A current having a peak surrounded by a broken line 501_R is a reduction current in the first step, and a current having a peak surrounded by a broken line 501_O is an oxidation current in the first step. A current having a peak surrounded by a broken line 502_R is a reduction current in first potential sweeping in the second step, and a current shown by a broken line 502 is a reduction current in second to fourth potential sweeping in the second step and an oxidation current in first to fourth potential sweeping in the second step. A current having a peak surrounded by a broken line 503_R is a reduction current in the third step, and a current having a peak surrounded by a broken line 503_O is an oxidation current in the third step.

The graph shows that the current value of the lithium secondary battery 1 was increased due to the potential sweeping from 1.5 V to 3 V, in the first to third steps. In other words, the graph shows that the resistance of the active material layer was decreased due to reduction treatment where a potential for promoting reduction reaction of the active material layer is supplied, i.e., electrochemical reduction treatment, and the current value was increased in the third step. Given the fact that the redox potential of $LifePO_4$ included in the active material layer is approximately 3.4 V, it can be said that a reduction current around 2 V was generated when the graphene oxide was reduced, which suggests that the reduction potential of the graphene oxide was approximately 2 V.

Figure 10:
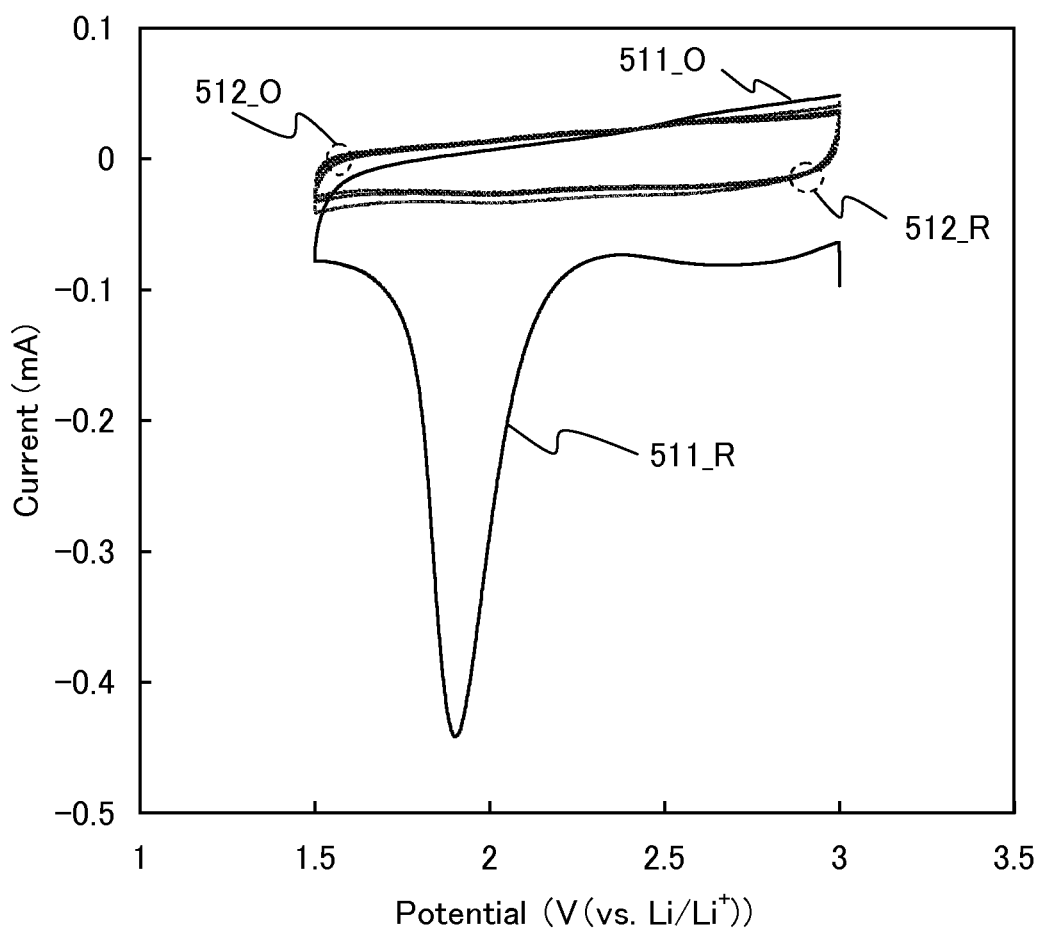
FIG. 10 shows a result of cyclic voltammetry measurement.

FIG. 10 is an enlarged graph showing the current-potential curves in the second step in FIG. 9.

In FIG. 10, a curve 511_R represents a reduction current in the first potential sweeping, and a curve 511_O represents an oxidation current in the first potential sweeping. Further, a curve 512_R represents a reduction current in the second to fourth potential sweeping, and a curve 512_O represents an oxidation current in the second to fourth potential sweeping.

As shown in FIG. 10, the reduction current in the first potential sweeping has a peak at around 2V. In contrast, the reduction current in the second and later potential sweeping does not have a peak at around 2 V. The oxidation current in the first to fourth potential sweeping does not have a significant change.

The measurement results reveal that the reduction reaction of the working electrode occurred due to the potential sweeping at 2 V, which was the reduction potential, whereas the reduction reaction did not occur in the second and later potential sweeping.

Here, in order to examine the reduction reaction caused at around 2 V, a comparative battery cell in which an active layer of a working electrode included only graphene oxide was fabricated and CV measurement thereof was performed.

First, the structure and the fabrication method of the comparative battery cell will be described.

The comparative battery cell was a coin battery. The comparative battery cell had the same structure as the lithium secondary battery 1 except that the active material layer of the working electrode, which included only graphene oxide, was provided over a current collector made of aluminum.

The graphene oxide was formed through steps similar to those of the graphene oxide used for the active material layer of the working electrode in the lithium secondary battery 1.

The working electrode in which the active material layer was provided over the current collector made of aluminum was formed in such a manner that 50 mg of graphene oxide was mixed with 4.5 g of water to form a paste, the paste was applied to the current collector, and drying was performed at 40° C. in vacuum.

The process of fabricating the comparative battery cell was similar to that of the lithium secondary battery 1.

Figure 11:
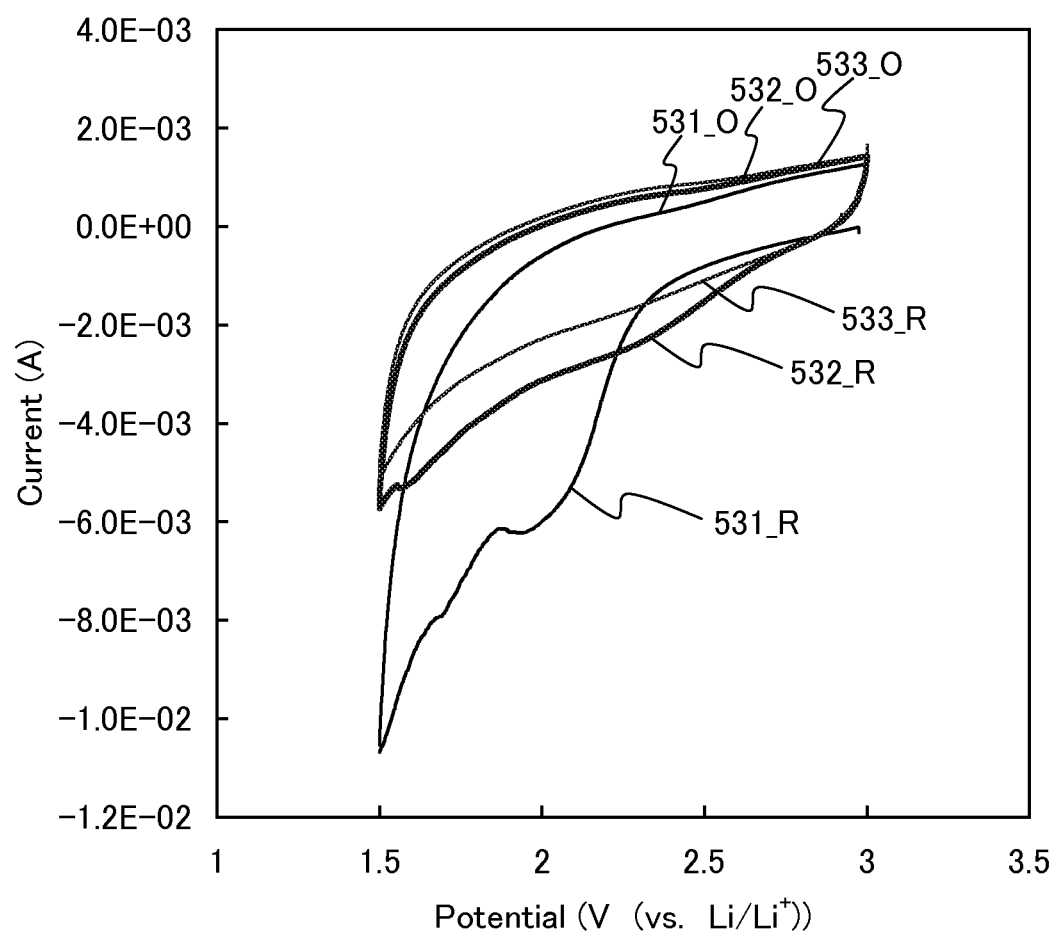
FIG. 11 shows a result of cyclic voltammetry measurement.

Next, CV measurement of the comparative battery cell was performed. The sweep rate was 0.1 mV/s. Under the condition that the sweep potential was 1.5 V to 3 V, a cycle in which a supplied potential was swept from 3 V to 1.5 V and then swept from 1.5 V to 3 V was repeated three times. FIG. 11 shows current-potential curves in this case.

In FIG. 11, the horizontal axis represents potential of the working electrode (vs. Li/Li$^+$), and the vertical axis represents current generated by reduction-oxidation. A curve 531_R represents a reduction current in the first potential sweeping, and a curve 531_O represents an oxidation current in the first potential sweeping. A curve 532_R represents a reduction current in the second potential sweeping, and a curve 532_O represents an oxidation current in the second potential sweeping. A curve 533_R represents a reduction current in the third potential sweeping, and a curve 533_O represents an oxidation current in the third potential sweeping.

As shown in FIG. 11, the reduction current in the first potential sweeping has a peak at around 2 V. This result suggests that the reduction potential of the graphene oxide was approximately 2 V. In contrast, the reduction current in the second and later potential sweeping does not have a peak at around 2 V. Although the oxidation current in the second and third potential sweeping is larger than that in the first potential sweeping, the oxidation current in the second and third potential sweeping does not have a significant change.

Figure 12:
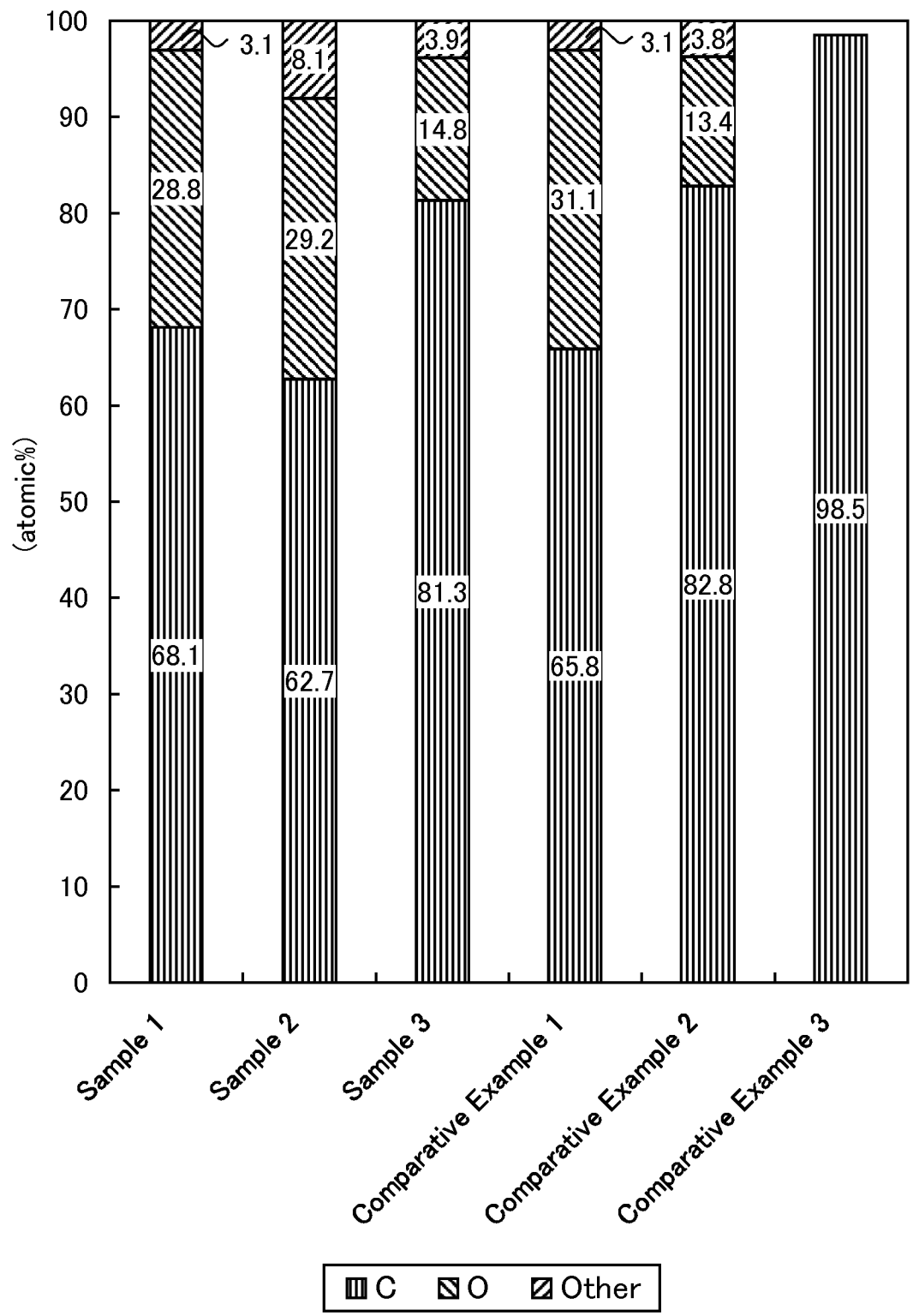
FIG. 12 shows XPS analyses of the composition of surface elements.
Figure 13:
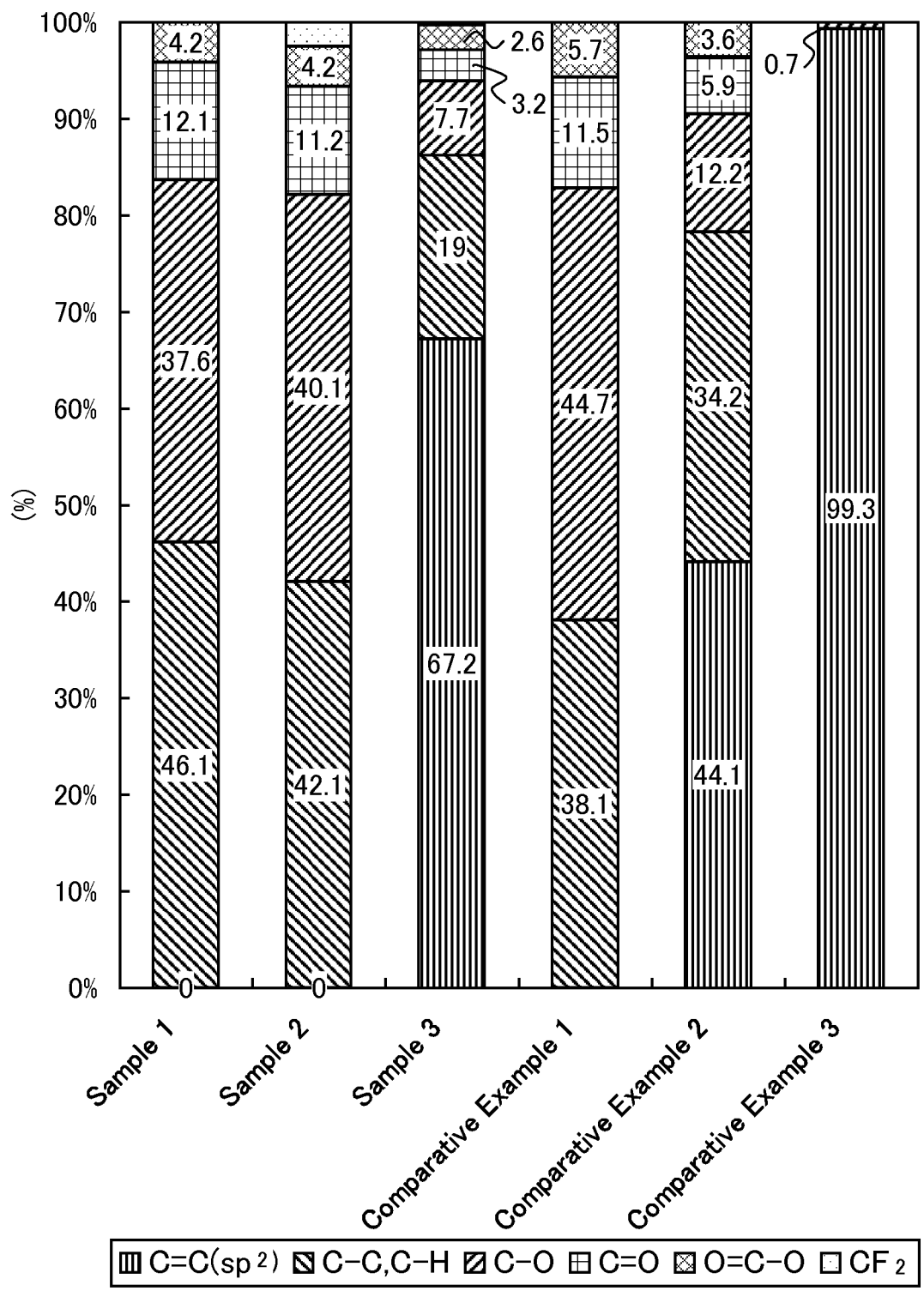
FIG. 13 shows XPS analyses of the states of atomic bonds.

FIGS. 12 and 13 show X-ray photoelectron spectroscopy (XPS) analysis results of the surface elemental composition of carbon, oxygen, and another element, and the states of the atomic bonds before and after electrochemical reduction treatment of the working electrode of comparative battery cells.

A sample 1 was formed by providing the mixed solution H containing graphene oxide, which is described in the formation steps of the working electrode of the lithium secondary battery 1, over a substrate made of aluminum and performing heating at 40° C. in vacuum for one hour. A sample 2 was formed by immersing the sample 1 in the electrolyte contained in the lithium secondary battery 1 for one day, performing washing with diethyl carbonate, and then performing drying at room temperature in vacuum for three hours. Note that the sample 1 and the sample 2 are samples before electrochemical reduction treatment. A sample 3 was formed in such a manner that a working electrode obtained by disassembling the comparative battery cell on which CV measurement was performed once was washed with diethyl carbonate, and drying was performed at room temperature in vacuum for three hours.

On the other hand, a sample obtained using a method for forming graphene not by electrochemical reduction of graphene oxide but by thermal reduction of graphene oxide and a sample formed using graphite were used as comparative examples.

A sample formed in such a manner that powdered graphene oxide obtained by drying the mixed solution H containing graphene oxide, which is described in the formation process of the lithium secondary battery 1, was provided over indium foil was used as a comparative example 1. A sample formed in such a manner that graphene obtained by heating the comparative example 1 at 300° C. in vacuum for ten hours to reduce the graphene oxide was provided over indium foil was used as a comparative example 2. A sample formed by providing powdered graphite over indium foil was used as a comparative example 3.

FIG. 12 shows XPS analysis results of the surface elemental composition in the samples 1 to 3 and the comparative examples 1 to 3.

FIG. 12 shows that the proportion of oxygen in the sample 3 was lower than that of each of the sample 1 and the sample 2, that the proportion of carbon in the sample 3 was higher than that of each of the sample 1 and the sample 2, and that the proportion of oxygen in the sample 3 obtained by electrochemical reduction was 14.8 at. %. FIG. 12 also shows that the proportion of oxygen in the comparative example 2 was lower than that of the comparative example 1 and the proportion of oxygen in the comparative example 2 obtained by thermal reduction was 13.4 at. %. The above results indicate that the graphene oxide was reduced by electrochemical reduction. The above results also indicate that the graphene oxide was reduced by thermal reduction.

FIG. 13 shows XPS analysis results of the states of the atomic bonds of near-surfaces of the samples 1 to 3 and the comparative examples 1 to 3.

FIG. 13 is a graph showing the evaluated proportions of sp$^2$ bonds of C denoted as C═C, sp$^3$ bonds of C such as C—C and C—H, C—O bonds, C═O bonds, CO$_2$ bonds (O═C—O bond), and CF$_2$ bonds.

The graph shows that the proportion of sp$^2$ bonds of C denoted as C—C in the sample 3 was higher than that of each of the sample 1 and the sample 2 and the proportions of sp$^3$ bonds of C such as C—C and C—H, C—O bonds, C═O bonds, and CO$_2$ bonds were lower than those of each of the sample 1 and the sample 2. These results reveal that electrochemical reduction treatment caused the reaction of sp$^3$ bonds, C—O bonds, C═O bonds, and CO$_2$ bonds, so that sp$^2$ bonds were formed. The proportion of sp$^2$ bonds in the sample 3 was 67.2%.

The graph also shows that the proportion of sp$^2$ bonds in the comparative example 2 was higher than that of the comparative example 1, as in the sample 3, but was lower than that of the sample 3. The proportion of $sp^2$ bonds in the comparative example 2 was 44.1%. That is to say, these results suggest that when electrochemical reduction treatment is performed, the proportion of $sp^2$ bonds becomes 50% to 70% inclusive.

Thus, FIGS. 11 to 13 indicate that the graphene oxide was reduced due to the sweeping of the reduction potential at around 2 V, so that graphene with many $sp^2$ bonds was formed. Further, FIGS. 10 and 12 show that the resistance of the active material layer was reduced due to the sweeping of the reduction potential at around 2 V, leading to an increase in current value of the lithium secondary battery. The analysis results in FIGS. 11 to 13 suggest that the resistance was reduced because the graphene oxide with low conductivity was reduced by electrochemical reduction to form graphene with high conductivity.

Example 2

In this example, the reduction potential of graphene oxide which was measured with a measurement system without electrode resistance components will be described.

It can be said that the resistance of the entire electrode including graphene oxide which was formed by the method described in Example 1 was high.

In this example, graphene oxide was sparsely attached to an electrode, and the reduction potential of the graphene oxide was measured with the measurement system, from which resistance components generated when the graphene oxide was stacked were removed.

Specifically, glassy carbon serving as a working electrode and platinum serving as a counter electrode were immersed in a graphene oxide dispersion liquid in which graphene oxide was dispersed in water as a solvent at 0.0027 g/L, and a voltage of 10 V was applied to the working electrode and the counter electrode for 30 seconds. After that, the glassy carbon to which graphene oxide was attached was dried in vacuum. Here, the glassy carbon to which graphene oxide was attached is a graphene oxide electrode A. Note that the graphene oxide used in this example was formed as in Example 1.

Thus, when electrophoresis in the graphene oxide dispersion liquid was performed while conditions were controlled, so that graphene oxide was able to be sparsely attached to glassy carbon serving as the working electrode.

Then, the graphene oxide electrode A, platinum, and lithium were used as a working electrode, a counter electrode, and a reference electrode, respectively, and CV measurement was performed. Note that in the CV measurement, a solution in which 1M $LiPF_6$ was dissolved in a mixed solution in which EC and DEC were mixed at a ratio of 1:1 was used as an electrolyte.

For the sweep rates in the CV measurement, the following three conditions were used: 10 mV/s (condition 1), 50 mV/s (condition 2), and 250 mV/s (condition 3). The range of sweep potential was the same in all the conditions 1 to 3. Potential sweeping was performed from a lower potential to a higher potential and from the higher potential to the lower potential, in the range of 1.8 V to 3.0 V from the immersion potential, three times.

Figure 15A:
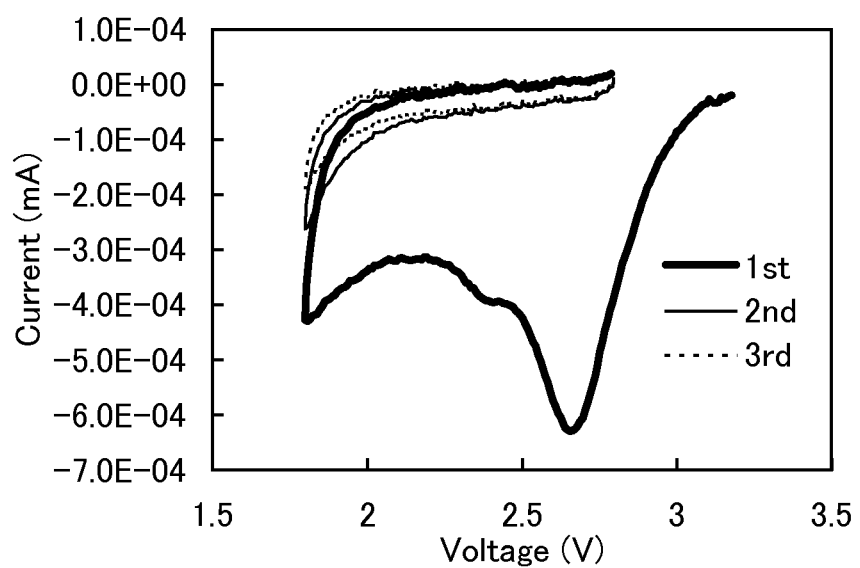
FIGS. 15A and 15B each show a result of cyclic voltammetry measurement.
Figure 15B:
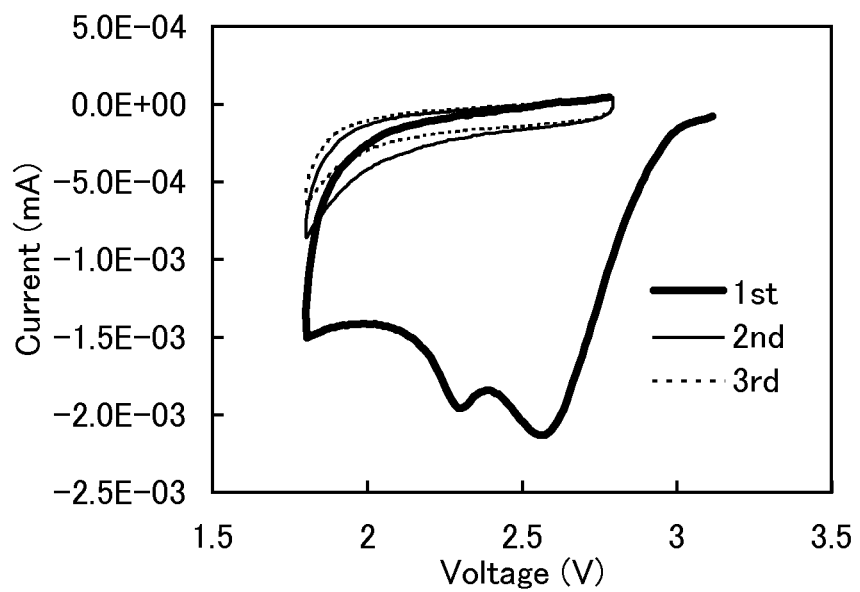
Figure 16A:
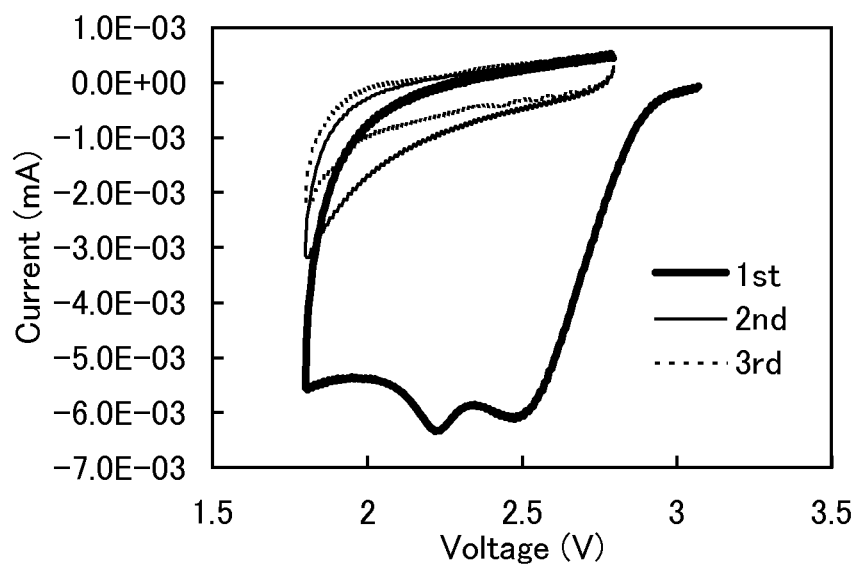
FIGS. 16A and 16B each show a result of cyclic voltammetry measurement.
Figure 16B:
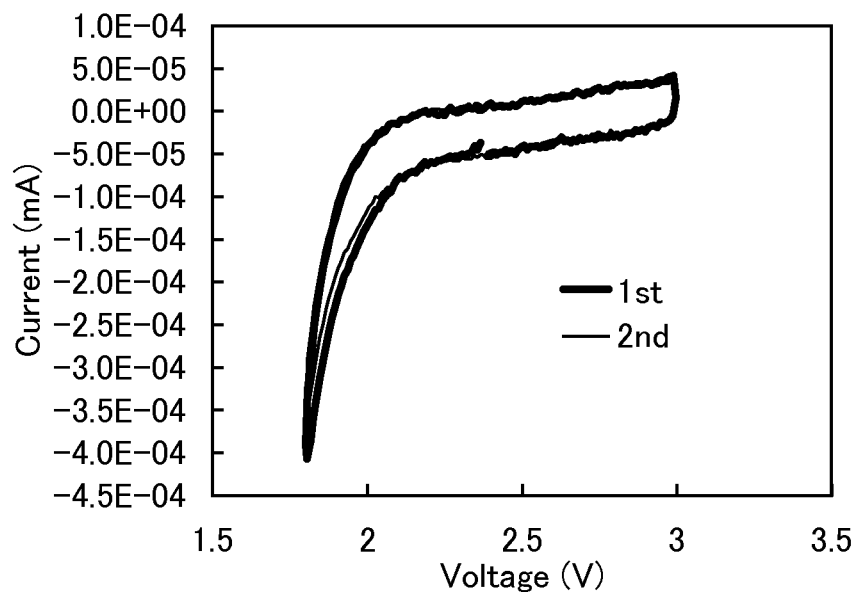

FIGS. 15A and 15B and FIG. 16A show CV measurement results under the conditions 1 to 3. FIG. 15A shows results under the condition 1. FIG. 15B shows results under the condition 2. FIG. 16A shows results under the condition 3. FIG. 16B shows CV measurement results of a comparative example formed using only glassy carbon as a working electrode. The condition for the CV measurement of the comparative example was the same as the condition 2 except that the potential sweeping was performed twice. Note that in FIGS. 15A and 15B and FIGS. 16A and 16B, the horizontal axis represents potential of the working electrode (vs. Li/Li$^+$), and the vertical axis represents current generated by reduction-oxidation.

FIG. 16B shows that in the comparative example in which graphene oxide was not attached to the working electrode, the redox reaction did not occur in the range of 1.8 V to 3.0 V.

On the other hand, in the results under the conditions 1 to 3, in the case of the graphene oxide electrode A, to which graphene oxide was attached, only peaks in the first potential sweeping are observed at 2.3 V and 2.6 V as irreversible reduction reactions. No peak in the second and third potential sweeping is observed as in the case of the comparative example (see FIGS. 15A and 15B and FIG. 16A).

Further, the results under the conditions 1 to 3 indicate that although there were differences in current flowing to the measurement system depending on the potential sweep rate, the positions of the peaks did not depend on the potential sweep rate and were approximately 2.3 V and approximately 2.6 V under all the conditions.

Thus, the peaks observed at 2.3 V and 2.6 V presumably correspond to the reduction reaction of the graphene oxide.

According to one embodiment of the present invention, graphene can be formed probably due to the supply of a potential at which the reduction reaction of graphene oxide occurs.

REFERENCE NUMERALS

S111: step, S112: step, S121: step, S122: step, S123: step, S124: step, S125: step, S126: step, S127: step, 113: container, 114: electrolyte, 115: conductive layer, 116: counter electrode, 201: negative electrode current collector, 203: negative electrode active material layer, 205: negative electrode, 211: negative electrode active material, 213: graphene, 221: negative electrode active material, 221a: common portion, 221b: projected portion, 223: graphene, 307: positive electrode current collector, 309: positive electrode active material layer, 311: positive electrode, 321: positive electrode active material, 323: graphene, 400: lithium secondary battery, 401: positive electrode current collector, 403: positive electrode active material layer, 405: positive electrode, 407: negative electrode current collector, 409: negative electrode active material layer, 411: negative electrode, 413: separator, 415: electrolyte, 417: external terminal, 419: external terminal, 421: gasket, 501_O: broken line, 501_R: broken line, 502: broken line, 502_R: broken line, 503_O: broken line, 503_R: broken line, 511_O: curve, 511_R: curve, 512_O: curve, 512_R: curve, 531_O: curve, 531_R: curve, 532_O: curve, 532_R: curve, 533_O: curve, 533_R: curve, 5000: display device, 5001: housing, 5002: display portion, 5003: speaker portion, 5004: power storage device, 5100: lighting device, 5101: housing, 5102: light source, 5103: power storage device, 5104: ceiling, 5105: wall, 5106: floor, 5107: window, 5200: indoor unit, 5201: housing, 5202: air outlet, 5203: power storage device, 5204: outdoor unit, 5300: electric refrigerator-freezer, 5301: housing, 5302: door for refrigerator, 5303: door for freezer, 5304: power storage device, 9630: housing, 9631: display portion, 9631a: display portion, 9631b: display portion, 9632a: touch panel area, 9632b: touch panel area, 9033: fastener, 9034: display-mode switching button, 9035: power button, 9036: power-saving-mode switching button, 9038: operation button, 9639: keyboard display switching button, 9633: solar cell, 9634: charge and discharge control circuit, 9635: battery, 9636: DC-DC converter, 9637: operation key, and 9638: converter This application is based on Japanese Patent Application serial no. 2011-217897 filed with the Japan Patent Office on Sep. 30, 2011, the entire contents of which are hereby incorporated by reference.

What is claimed is:

1. A lithium secondary battery comprising:
   an active material layer comprising:
   a particle of an active material; and
   a carbon material comprising a six-membered ring composed of carbon atoms,
   wherein in X-ray photoelectron spectroscopy of the carbon material, a proportion of carbon atoms is higher than or equal to 80% and lower than 90%,
   wherein in X-ray photoelectron spectroscopy of the carbon material, a proportion of oxygen atoms is higher than or equal to 10% and lower than 20%,
   wherein a sum of the proportion of the carbon atoms and the proportion of the oxygen atoms is lower than 100%,
   wherein in bonds of the carbon atoms, a proportion of $sp^2$-bonded carbon atoms of the carbon atoms measured by X-ray photoelectron spectroscopy is higher than or equal to 50% and lower than or equal to 80%, and
   wherein the carbon material and the particle of the active material are randomly dispersed in the active material layer.

2. The lithium secondary battery according to claim 1, wherein the active material comprises a positive electrode active material.

3. The lithium secondary battery according to claim 2, wherein the positive electrode active material comprises one of $LiFeO_2$, $LiCoO_2$, $LiNiO_2$, and $LiMn_2O_4$.

4. The lithium secondary battery according to claim 1, wherein the active material comprises a negative electrode active material, and
   wherein the negative electrode active material comprises silicon.

5. A lithium secondary battery comprising:
   a carbon material comprising:
   a six-membered ring composed of carbon atoms; and
   a many-membered ring formed when a carbon bond in part of the six-membered ring is broken,
   wherein in X-ray photoelectron spectroscopy of the carbon material, a proportion of carbon atoms is higher than or equal to 80% and lower than 90%,
   wherein in X-ray photoelectron spectroscopy of the carbon material, a proportion of oxygen atoms is higher than or equal to 10% and lower than 20%,
   wherein a sum of the proportion of the carbon atoms and the proportion of the oxygen atoms is lower than 100%, and
   wherein in bonds of the carbon atoms, a proportion of $sp^2$-bonded carbon atoms of the carbon atoms measured by X-ray photoelectron spectroscopy is higher than or equal to 50% and lower than or equal to 80%.

6. The lithium secondary battery according to claim 5, further comprising an active material.

7. The lithium secondary battery according to claim 5, further comprising a positive electrode active material.

8. The lithium secondary battery according to claim 7, wherein the positive electrode active material comprises one of $LiFeO_2$, $LiCoO_2$, $LiNiO_2$, and $LiMn_2O_4$.

9. The lithium secondary battery according to claim 5, further comprising a negative electrode active material, wherein the negative electrode active material comprises silicon.

10. A lithium secondary battery comprising:
    a carbon material comprising:
    a six-membered ring composed of carbon atoms; and
    a many-membered ring formed when a carbon bond in part of the six-membered ring is broken,
    wherein the many-membered ring comprises one of a seven-membered ring, an eight-membered ring, a nine-membered ring, and a ten-membered ring,
    wherein in X-ray photoelectron spectroscopy of the carbon material, a proportion of carbon atoms is higher than or equal to 80% and lower than 90%,
    wherein in X-ray photoelectron spectroscopy of the carbon material, a proportion of oxygen atoms is higher than or equal to 10% and lower than 20%,
    wherein a sum of the proportion of the carbon atoms and the proportion of the oxygen atoms is lower than 100%, and
    wherein in bonds of the carbon atoms, a proportion of $sp^2$-bonded carbon atoms of the carbon atoms measured by X-ray photoelectron spectroscopy is higher than or equal to 50% and lower than or equal to 80%.

11. The lithium secondary battery according to claim 10, further comprising an active material.

12. The lithium secondary battery according to claim 10, further comprising a positive electrode active material.

13. The lithium secondary battery according to claim 12, wherein the positive electrode active material comprises one of $LiFeO_2$, $LiCoO_2$, $LiNiO_2$, and $LiMn_2O_4$.

14. The lithium secondary battery according to claim 10, further comprising a negative electrode active material, wherein the negative electrode active material comprises silicon.

* * * * *